United States Patent
Bryant

(10) Patent No.: US 11,908,267 B2
(45) Date of Patent: *Feb. 20, 2024

(54) SYSTEMS AND METHODS FOR GAME STATE RETENTION AND CONTINUATION AT ELECTRONIC GAMING MACHINES

(71) Applicant: Aristocrat Technologies Australia Pty Limited, North Ryde (AU)

(72) Inventor: Natalie Bryant, Cherrybrook (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,367

(22) Filed: Jan. 13, 2023

(65) Prior Publication Data
US 2023/0145737 A1 May 11, 2023

Related U.S. Application Data

(63) Continuation of application No. 17/365,776, filed on Jul. 1, 2021, now Pat. No. 11,568,709, which is a
(Continued)

(30) Foreign Application Priority Data

Mar. 28, 2018 (AU) ................................. 2018901037
Apr. 23, 2018 (AU) ................................. 2018202797

(51) Int. Cl.
*G07F 17/32* (2006.01)
*G06K 19/06* (2006.01)

(52) U.S. Cl.
CPC ... *G07F 17/3223* (2013.01); *G06K 19/06037* (2013.01); *G07F 17/3213* (2013.01); *G07F 17/3225* (2013.01); *G07F 17/3241* (2013.01)

(58) Field of Classification Search
CPC ............. G07F 17/3213; G07F 17/3223; G07F 17/3225; G07F 17/3241; G06K 19/06037; A63F 13/49; A63F 13/493
See application file for complete search history.

(56) References Cited

U.S. PATENT DOCUMENTS 7,118,482 B2 * 10/2006 Ishihara .................. A63F 13/58
463/43
7,510,116 B2 3/2009 Robb
(Continued)

OTHER PUBLICATIONS

Australian Examination Report No. 1 for App. No. AU2019261812, dated Jan. 4, 2021, 5 pages.
(Continued)

*Primary Examiner* — William H McCulloch, Jr.
(74) *Attorney, Agent, or Firm* — Armstrong Teasdale LLP

(57) ABSTRACT

An electronic gaming machine includes a display device and a processor configured to execute instructions stored in a memory, which when executed by the processor, cause the processor to generate a game-state-retention sign based upon a plurality of game variables representing a state of a wagering game, where the game-state-retention sign includes a first two-dimensional machine-recognisable image that encodes the plurality of game variables. When executed, the instructions also cause the processor to display the game-state-retention sign on the display device for image capture by a handheld player device, where the handheld player device is configured to display a game-continuation sign generated from the game-state-retention sign for resuming play of the wagering game.

20 Claims, 16 Drawing Sheets

Related U.S. Application Data continuation of application No. 16/366,723, filed on Mar. 27, 2019, now Pat. No. 11,087,588.

(56) References Cited

U.S. PATENT DOCUMENTS

| | | | |
|---|---|---|---|
| 7,828,652 B2 | 11/2010 | Nguyen | |
| 7,993,195 B2 | 8/2011 | Belger | |
| 8,562,410 B2 | 10/2013 | Belger | |
| 9,336,644 B2 | 5/2016 | Graf | |
| 9,514,605 B2 | 12/2016 | Nicely | |
| 9,569,930 B2 | 2/2017 | Baerlocher | |
| 9,607,477 B2 | 3/2017 | Gagner | |
| 9,633,516 B2 | 4/2017 | Nelson | |
| 9,776,087 B1* | 10/2017 | Campbell | A63F 13/497 |
| 9,852,578 B2* | 12/2017 | Nelson | G07F 17/32 |
| 9,881,445 B2 | 1/2018 | Morrow | |
| 10,089,828 B2 | 10/2018 | Nelson | |
| 10,453,299 B2 | 10/2019 | Boesen | |
| 10,643,426 B2 | 5/2020 | Higgins | |
| 10,867,475 B1 | 12/2020 | Nelson | |
| 11,087,588 B2* | 8/2021 | Bryant | G07F 17/3241 |
| 11,100,754 B2 | 8/2021 | Boesen | |
| 11,568,709 B2* | 1/2023 | Bryant | G06K 19/06037 |
| 2013/0130779 A1 | 5/2013 | Gagner | |
| 2013/0324230 A1 | 12/2013 | Iddings | |
| 2014/0094272 A1 | 4/2014 | Kelly | |
| 2014/0155140 A1* | 6/2014 | Mikoshiba | A63F 13/847 463/31 |
| 2014/0256407 A1 | 9/2014 | Graf | |
| 2014/0302915 A1 | 10/2014 | Lyons | |
| 2015/0011309 A1* | 1/2015 | Eloff | A63F 13/30 463/29 |
| 2017/0092054 A1 | 3/2017 | Petersen | |
| 2019/0188956 A1 | 6/2019 | Higgins | |
| 2019/0304248 A1 | 10/2019 | Bryant | |
| 2020/0265676 A1 | 8/2020 | Higgins | |
| 2020/0273288 A1 | 8/2020 | Higgins | |
| 2021/0327212 A1 | 10/2021 | Bryant | |
| 2021/0369542 A1* | 12/2021 | Stuart | A61H 3/00 |
| 2023/0145737 A1* | 5/2023 | Bryant | G07F 17/3225 463/42 |

OTHER PUBLICATIONS

Notice of Allowance dated Mar. 24, 2021 for U.S. Appl. No. 16/366,723 (pp. 1-10).

Office Action (Non-Final Rejection) dated Jul. 15, 2022 for U.S. Appl. No. 17/365,776 (pp. 1-5).

Office Action (Notice of Allowance and Fees Due (PTOL-85)) dated Nov. 7, 2022 for U.S. Appl. No. 17/365,776 (pp. 1-5).

* cited by examiner

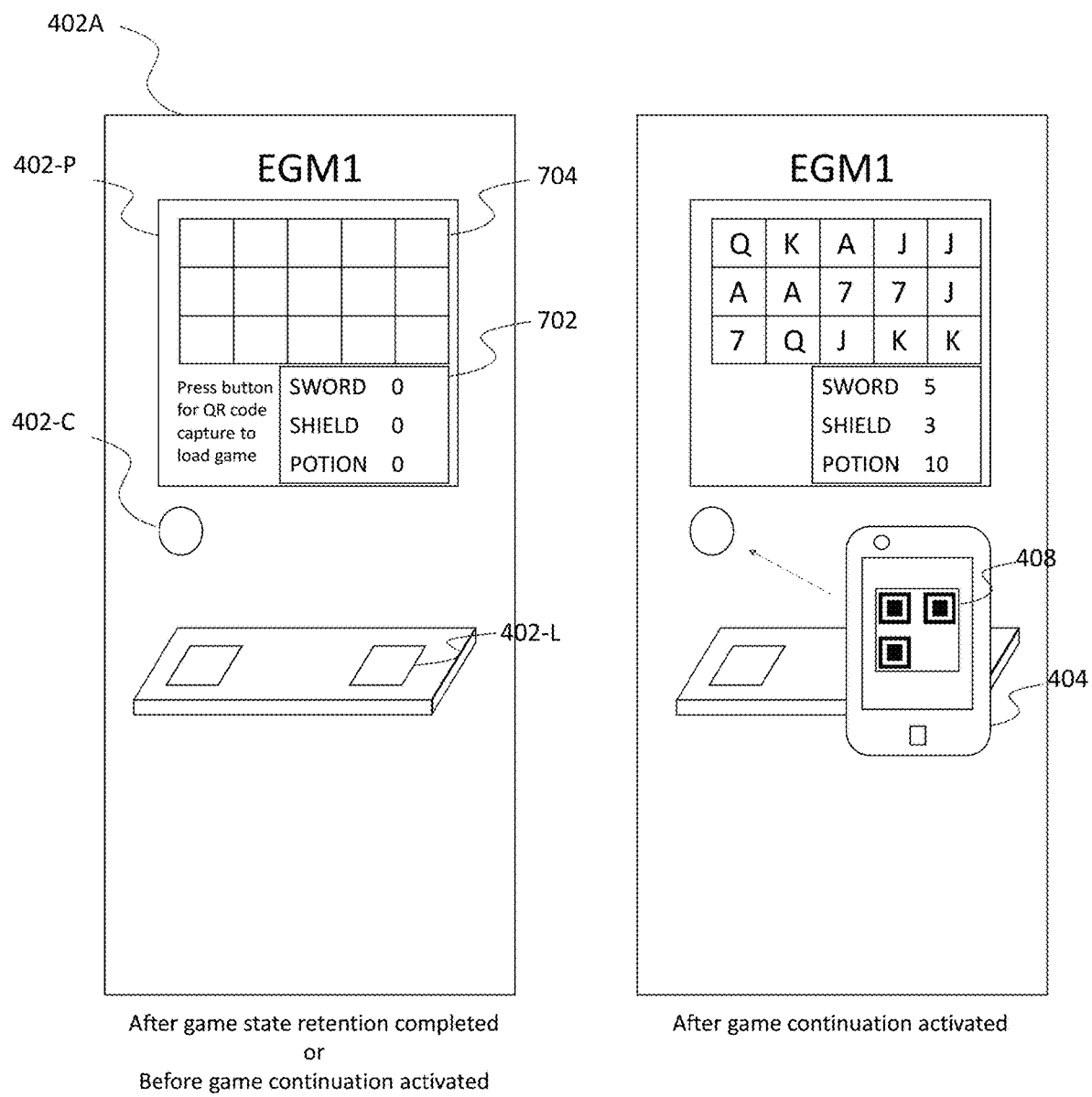
Fig. 7C — After game state retention completed or Before game continuation activated
Fig. 7D — After game continuation activated

SYSTEMS AND METHODS FOR GAME STATE RETENTION AND CONTINUATION AT ELECTRONIC GAMING MACHINES

RELATED APPLICATIONS

This application is a continuation of and claims priority to U.S. patent application Ser. No. 17/365,776, filed Jul. 1, 2021, which is a continuation of U.S. patent application Ser. No. 16/366,723, filed Mar. 27, 2019, which claims priority to Australian Patent Application No. 2018202797, filed on Apr. 23, 2018, which claims priority to Australian Provisional Patent Application No. 2018901037, filed Mar. 28, 2018, each of which is incorporated herein by reference in its entirety.

FIELD

The present disclosure generally relates to state retention and continuation of a game playable at one or more electronic gaming machines, and particularly the state retention and continuation of a game played at one or multiple electronic gaming machines over multiple gaming sessions.

BACKGROUND

Gaming machines installed at a venue are typically operated by a venue operator. The venue may be an entertainment establishment, such as a casino or a gaming arcade. The same game title may be offered at multiple gaming machines, such as a bank of gaming machines, at the same venue.

To allow game state retention and game continuation at a venue, the venue operator may employ a player tracking system that utilises player-specific trackers (e.g. magnetic stripe cards) to distinguish one player or player account from another. For example, a person having a game at one machine at the venue may be allowed to retain the state of the game against the person's tracker (e.g. via a magnetic card reader), with the retained state stored at the venue's electronic storage. Further, the person may be allowed to later continue the game at the same or another machine at the venue upon presentation of the player's tracker (e.g. via a magnetic card reader), with the retained state retrieved from the venue's electronic storage. This arrangement permits game state retention and continuation within the same venue.

It is not uncommon for the same game title to be offered on gaming machines deployed at different venues, for example operated by different venue operators. A player having played a specific game title at one venue may desire to play the same game title, and possibly continue from an earlier game state, while visiting a different venue. Where a player tracking system is only transparent to its venue operator and hence venue-specific, it does not permit game state retention and game continuation across multiple venues. Doing so requires additional infrastructure in place (e.g. backend connectivity via private or public communication networks and central data storage/database to collect player data including and game specific data in a format recognisable to the system) and/or additional time (e.g. upload/download time) to connect the multiple venues for relevant data transfer or retrieval.

SUMMARY

In one aspect, an electronic gaming machine is described. The electronic gaming machine includes a display device and a processor configured to execute instructions stored in a memory, which when executed by the processor, cause the processor to generate a game-state-retention sign based upon a plurality of game variables representing a state of a wagering game, where the game-state-retention sign includes a first two-dimensional machine-recognisable image that encodes the plurality of game variables. When executed, the instructions also cause the processor to display the game-state-retention sign on the display device for image capture by a handheld player device, where the handheld player device is configured to display a game-continuation sign generated from the game-state-retention sign for resuming play of the wagering game.

In another aspect, a method of game state retention and game continuation in an electronic wagering game is described. The method includes generating a game-state-retention sign based upon a plurality of game variables representing a state of a wagering game, where the game-state-retention sign includes a first two-dimensional machine-recognisable image that encodes the plurality of game variables. The method also includes displaying the game-state-retention sign on the display device for image capture by a handheld player device, where the handheld player device is configured to display a game-continuation sign generated from the game-state-retention sign for resuming play of the wagering game.

In yet another aspect, a tangible, non-transitory, computer-readable storage medium is described. The storage medium has instructions stored thereon, which when executed by a processor, cause the processor to at least generate a game-state-retention sign based upon a plurality of game variables representing a state of a wagering game, where the game-state-retention sign includes a first two-dimensional machine-recognisable image that encodes the plurality of game variables. The instructions also cause the processor to display the game-state-retention sign on the display device for image capture by a handheld player device, where the handheld player device is configured to display a game-continuation sign generated from the game-state-retention sign for resuming play of the wagering game According to another aspect of the present disclosure, there is provided a method of game state retention and game continuation at one or more gaming machines, the method including the steps of:
- at a first gaming machine, generating a game-state-retention sign, the game-state-retention sign being machine-recognisable and containing a state of a game;
- at the first gaming machine, presenting the game-state-retention sign for capture;
- at the first or a second gaming machine, capturing a game-continuation machine-recognisable sign, the game-continuation machine-recognisable sign being machine-recognisable and related to the game-state-retention sign; and at the first or the second gaming machine, continuing conducting the game based on the game-continuation sign.

According to another aspect of the present disclosure, there is provided a method of game state retention and game continuation, the method including the steps of:
- at a player device, capturing a game-state-retention sign presented at a first gaming machine distinct from the player device, the game-state-retention sign being machine-recognisable and generated by the first gaming machine and containing at least partly a state of a game;
- at a player device, presenting a game-continuation sign related to the game-state-retention sign to the first or a second gaming machine distinct from the player device so as to continue conducting the game on the first or the second gaming machine, the game-continuation sign being machine-recognisable.

According to another aspect of the present disclosure, there is provided a gaming system for game state retention and game continuation at one or more gaming machines, the system including:

a plurality of gaming machine each configured to:
generate a game-state-retention sign, the game-state-retention sign being machine-recognisable and containing at least partly a state of a game;
presenting the game-state-retention sign for capture;
capturing a game-continuation sign, the game-continuation sign being machine-recognisable and related to the game-state-retention sign; and
continuing conducting the game based on the game-continuation sign.

According to another aspect of the present disclosure, there is provided a player device for game state retention and game continuation, the player device including:

a sign capturer to capture a game-state-retention sign presented at one of a plurality of gaming machines, the game-state-retention sign being machine-recognisable and generated based on a state of a game;
a sign presenter to present a game-continuation sign, being machine-recognisable and related to the game-state-retention sign, so as to continue conducting the game on the one or another of the plurality of gaming machines.

BRIEF DESCRIPTION OF ACCOMPANYING DRAWINGS

FIGS. 7C and 7D illustrate schematically an example of information displayed on a gaming machine before and after, respectively, the activation of game continuation function.

DETAILED DESCRIPTION OF EMBODIMENTS

Figure 1:
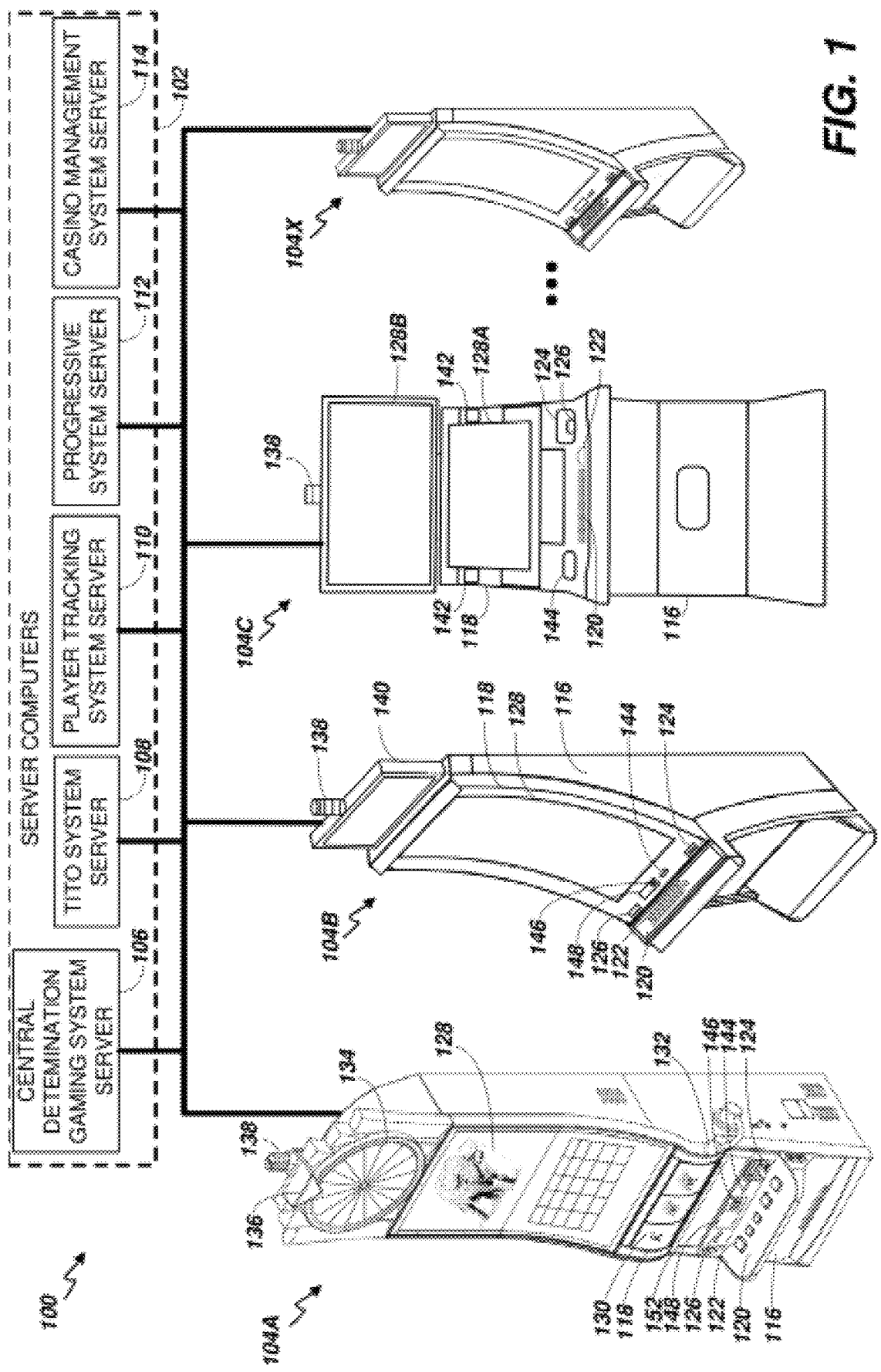
FIG. 1 is an exemplary diagram showing several EGMs networked with various gaming related servers.

Systems and methods for retaining a state of a wagering game and continuing the game from the retained state of the game are generally provided. A state of a game may include, for example, the game itself (e.g., game title), a player's credit balance in the game based upon player of the game up to a certain point, and a last or current game outcome, such as a current symbol combination displayed by a plurality of reels, if, for example, the game is a reel-based wagering game. To retain a state of a game, in general terms, an electronic gaming machine may generate and display a symbol (e.g., a barcode) that encodes the state of the game. A player may scan or capture the displayed barcode using a handheld device (e.g., a phone or tablet). The player's handheld device may store the barcode that it has captured (or the state of the game if the data encoded by the barcode is decoded and stored). Later, when the player is ready to resume play of the wagering game, the handheld device may display the barcode to an EGM (e.g., the same or a different EGM). The EGM may capture the barcode, decode the game state encoded by the barcode, and resume the player's previous game from the information decoded.

Disclosed herein are a method, system, electronic gaming machine(s) (EGM(s)) and machine-readable medium for state retention and continuation of a game playable at one or more gaming machines. The present disclosure aims at providing a mechanism for conducting a game over multiple gaming sessions. While player tracking systems may allow a level of game state retention and game continuation, player tracking systems are known to be non-venue-transparent. In such cases, a game commenced at one gaming machine at one venue may not be able to be continued at another gaming machine at another venue. It would be useful to address such non-venue-transparency regardless of the venue operators or the player tracking system used, or at least to provide an alternative to using existing player tracking systems. At least some arrangements aim at providing a game state retention and game continuation mechanism across different venues, regardless of the venue operator and/or player tracking system, to address deficiencies in venue or protocol-specific player tracking systems.

The present disclosure is to be contrasted with the saving and loading of the likes of personal computer games. In personal computer gaming, a player can often save the state of a game in readily accessible storage (e.g. a harddrive, a USB thumbdrive or a cloud drive) for later re-loading. In contrast, gaming machines are highly regulated in most jurisdictions. As a result, gaming machines often include technical measures to prevent non-authorised personnel from tampering with the machines. Depending on the regulations, such technical measures can include prevention of electronic or electrical connection or operational modification to a gaming machine. In recognising these anti-tampering measures required by regulations, the inventor(s) recognise the technical hurdles in uploading or downloading information, including any state of a game, to or from a gaming machine. Further, with the recognition of such technical hurdles, the inventor(s) have devised arrangements in which players can retain the state of a game at a gaming machine, and continue the same state of the game at the same or a different gaming machine at a later time.

In the present disclosure, use of machine-recognisable signs (e.g. in the form of QR codes) to be captured and presented by a player device (e.g. a camera-equipped mobile device) allows game states to be retained in a transportable form for later game continuation. The retained game state may be resumed at the same venue or different venues. Where the variables of the game state are contained entirely in the machine-recognisable sign (hereinafter just "sign" for simplicity), the disclosed mechanism requires no game variables retrieval or transfer.

General Arrangements

The present disclosure relates to arrangements involving electronic gaming machines (EGMs), for example in the context of Class 3 gaming. FIG. 1 illustrates several different models of EGMs which may be networked to various gaming related servers. The present disclosure can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present disclosure may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
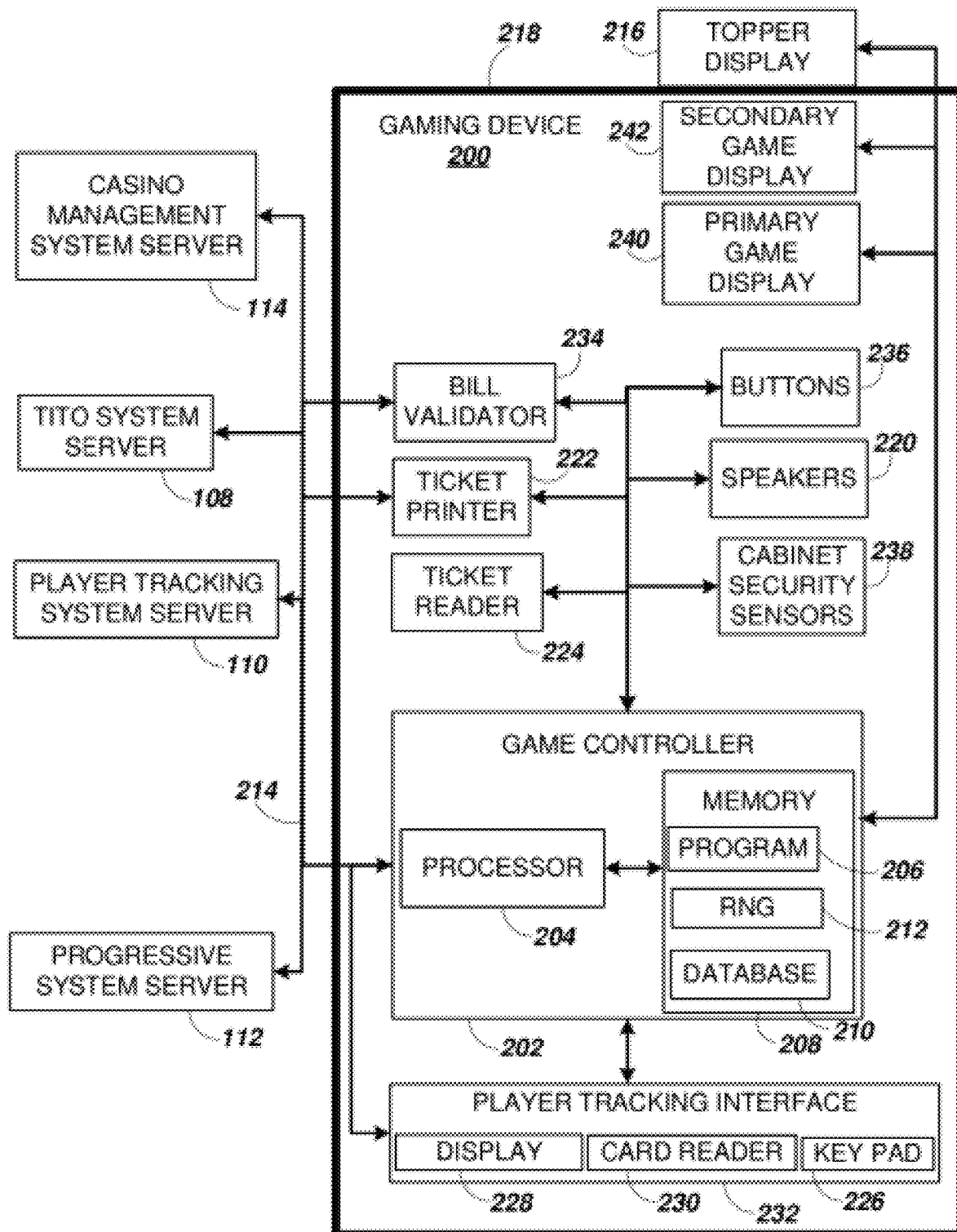
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's Level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher (or another form of readable token) through an appropriate input device such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance using an output device that can output at least one of physical currency and a token representing currency (typically by pressing a cash out button to receive a ticket from the ticket printer 222). The ticket may be "cashed-in" for money or inserted into another machine to establish a credit balance for play.

Further Details of the Disclosed Arrangements

Figure 3:
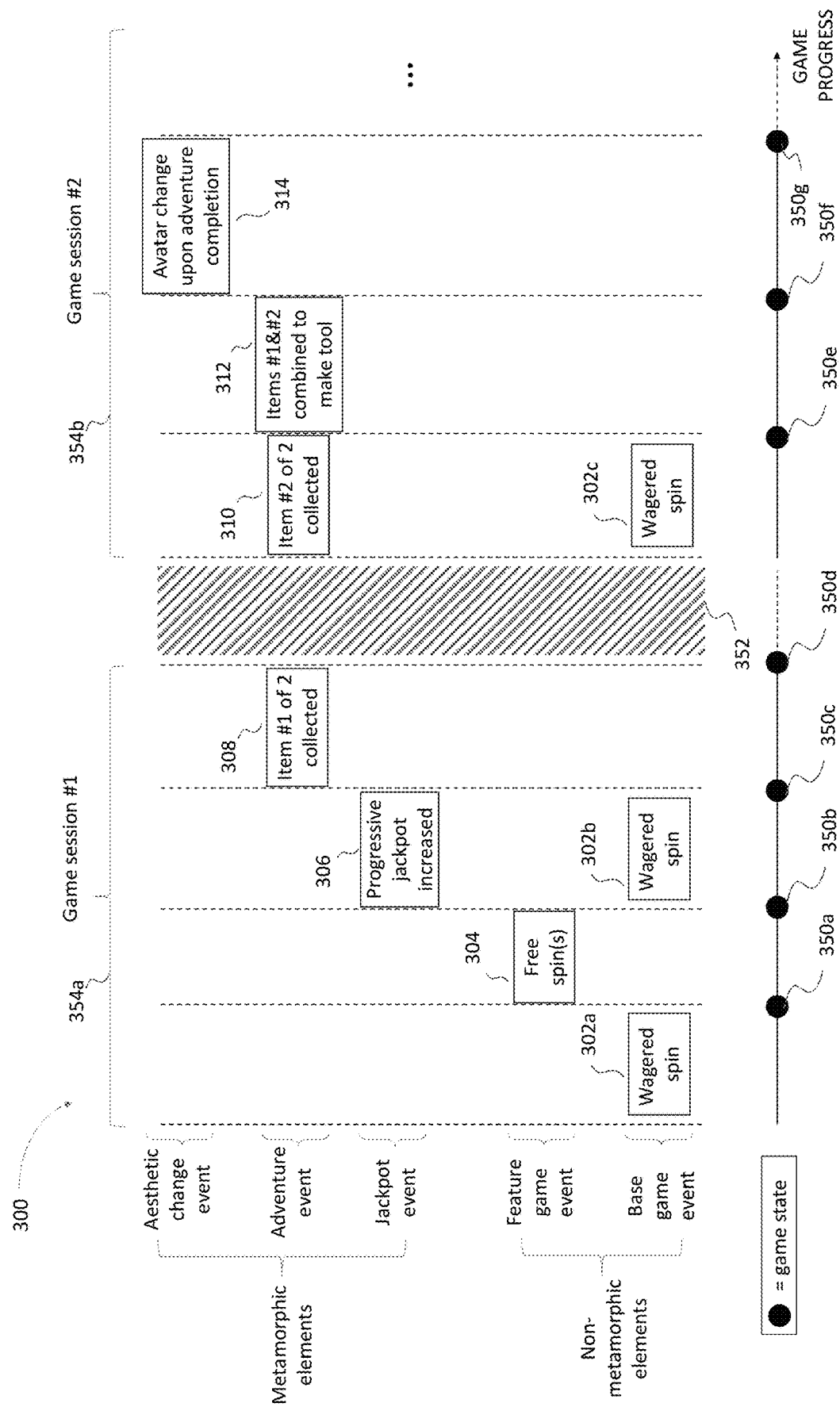
FIG. 3 illustrates a schematic example of a game progressing through different game states over occurrences of corresponding game events in multiple game sessions.

In the present context, a game is generally related to software, programmes or machine instructions that can be read or implemented by a gaming machine, configurable to receive input from a player (e.g. any one or more of a wager, a button activation, and icon selection) and produce output (e.g. any one or more of a displayed outcome, sound, and credit awards) which is at least in part controlled by a game processor. Referring to FIG. 3, a game 300 includes one or more game events which occur during the game 300. Each completed occurrence of a game event changes the game state (350a . . . 350g, or collectively 350) of the game 300. The present disclosure facilitates retention of at least one of these game states as the "check-points" of the game 300, as well as continuation of the game 300 from a retained game state. This facilitation allows the game 300 to be conducted in one or more multiple game sessions, such as a first game session 354a (concluded with the game state 350d) and a second game session 354b (commenced with the game state 350d). A game session is a largely uninterrupted period of gaming, for example started and completed by logging in and out of a player-tracking system, respectively. Each game session is associated with one or more game events. Consecutive game sessions are separated by a non-gaming period 352.

A game event may be associated with a non-metamorphic element, such as a wagered spin 302a of displayed reels (e.g. virtual or real) in a base game, or a free spin 304 of displayed reels in a feature game. In the context of Class III gaming, at least some game events such as the reel spinning events involve random processes, with the duration of each of these game events generally quite short, for example commencing when a player places a wager, and completing when the player receives an outcome for that wager such that the player is required to place another wager to continue progress the game 300. Each such game event may include awarding of any outcome responsive to a reel spin. An outcome may include an increase and/or a decrease of available game credits, and/or an award of a number of free reel spins. For example, wagered spin 302a may result in an increase in 100 game credits, as well as an award of 5 free spins. Responsive to wagered spin 302a, the game state 350a includes game variables such as the resulting game credits as well as the available free spins. Responsive to free spin(x) 3004, the game state 350b includes game variables such as the resulting game credits following free spin 304 but no available free spins. Alternatively, there may not be a spinning reel outcome at all.

A game event may be associated with a metamorphic element, such as accumulation 306 of a progressive jackpot. In the accumulation 306 of the progressive jackpot, each bet increases the size of the jackpot pool. For example, the progressive jackpot accumulation 306 may be responsive to a wagered spin 302b. In this example, the game state 350c includes game variables such as the size of the resulting jackpot pool. When the jackpot is won in a game event, the amount that is awarded is different depending on the current state of the jackpot pool as determined by previous game events.

Another instance of a game event associated with a metamorphic element is collection of a collectable item (e.g. a sword, a shield or a potion). For example, an item #1 may be uncovered in an adventure by the player and collected during the game 300. Responsive to the collection 308 of collectable item #1 during the adventure, the game state 350*d* includes game variables such as the player's inventory of items, expanded by collection of item #1. As another example, a wagered spin 302*c* of displayed reel may result in an outcome that awards a collectable item #2 collected during the game 300. Responsive to the collection 310 of awarded item #2, the game state 350*e* includes game variables such as the player's inventory, further expanded by collection of item #2. Yet another instance of a game event associated with a metamorphic element is completion of a task, or activation of game features or unlocking of special play modes. For example, the player may apply collected items #1 and #2 in combination to make a required tool. Responsive to the making 312 of the required tool, the game state 350*f* includes game variables such as the player's updated list of completed tasks, including the making of the required tool, and any activated game features or unlocked play modes. Still another instance of a game event associated with a metamorphic element is an aesthetic change (e.g. skins, and/or colours) and/or operational change of the game 300. For example, completion of an adventure may change the player's avatar and/or the way a game plays or the outcomes that are revealed. Responsive to the aesthetic change 314 of the player's avatar, the game state 350*g* includes game variables such as the player's new avatar.

Multiple game events may occur in a non-time-overlapping manner, such as consecutive wagered spins 302*a*, 302*b* and 302*c* of the displayed reels, where each spin completes before another spin commences. Alternatively, multiple game events may occur in a time-overlapping manner, such as the concurrent progression of two tasks, where one task commences before the other one completes. While FIG. 3 illustrates a linear game progression, it should be apparent to a skilled person that the game progression is not limited to linear but may be multi-dimensional. Arrangements of the present disclosure facilitates to retain one or more of the aforementioned exemplary game states 350*a* . . . 350*g*. This facilitation allows metamorphic game elements to be carried with the player who triggered/activated them rather than staying with the gaming machine on which they were triggered/activated.

Figure 4:
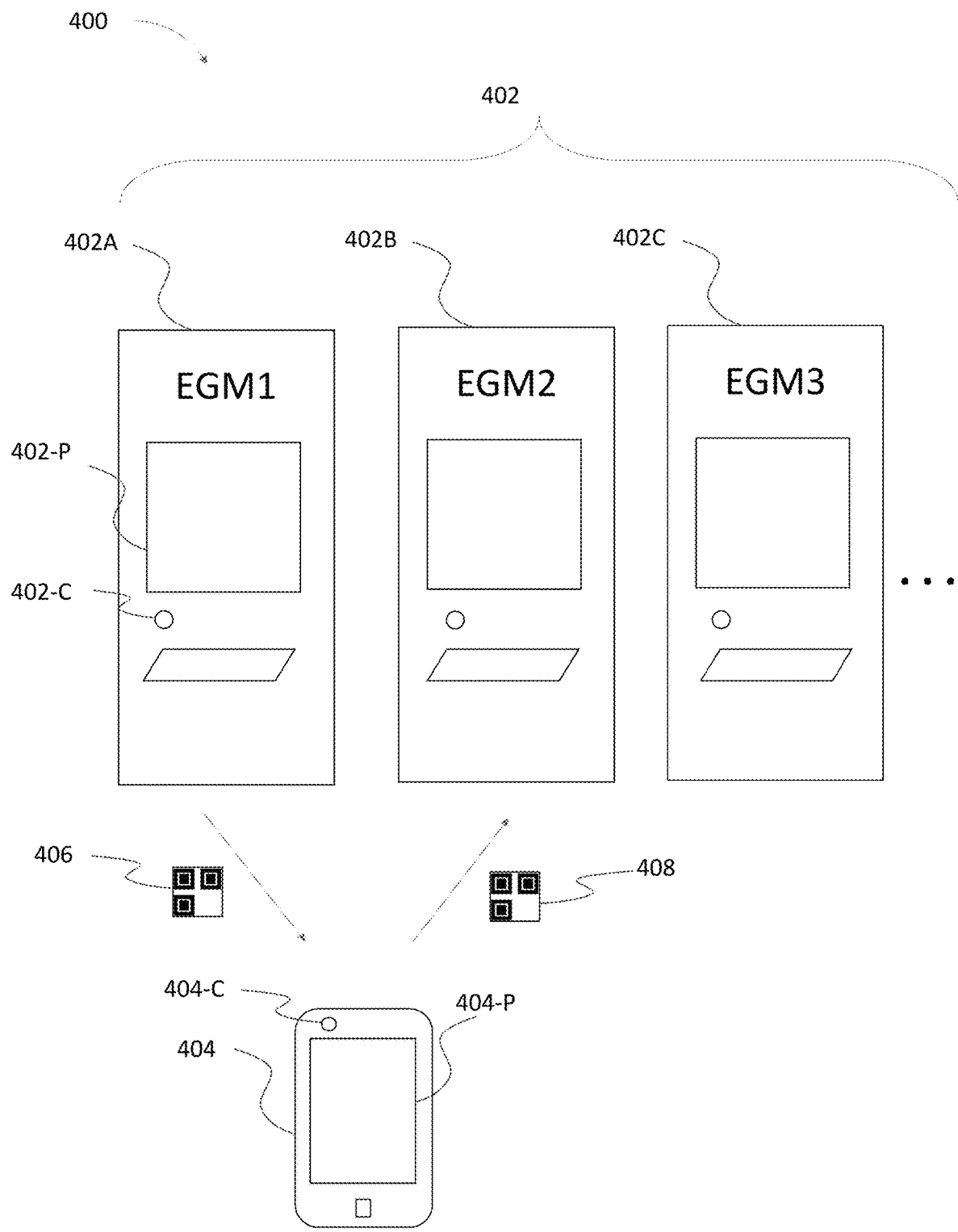
FIG. 4 illustrates an example of a system, including one or more gaming machines and a player device, for game state retention and game continuation.

FIG. 4 illustrates a system 400 of game state retention and game continuation. The system 400 includes one or more electronic gaming machines, or EGMs, (e.g. 402A, 402B, 402C, etc, or collectively or individually 402) and a player device 404, such as a smartphone, a tablet, or mobile computing device. General arrangements of the EGMs are described above. The player device 404 is distinct from the gaming machines 402. The gaming machines 402 are usually located in one or more venues, and hence comparatively stationary. The player device 404 is usually carried by a player, and hence comparatively mobile or otherwise transportable. A skilled person should appreciate that the system 400 may include further player devices (not shown) each associated with a further player. Each of the gaming machines 402 includes a sign presenter 402-P (e.g. an electronic display) and a sign capturer 402-C (e.g. a QR code scanner). Similarly, the player device 404 includes a sign presenter 404-P (e.g. an electronic display) and a sign capturer 404-C (e.g. a front and/or back camera).

The one or more gaming machines 402 are each operable to generate a game-state-retention sign 406, and present the sign 406 for capture by the player device 404. The game-state-retention sign 406 is generated based on a current state of a game 300 (e.g. any one of 350*a* . . . 350*g*) at one of the EGMs 402. The game-state-retention sign 406 contains at least partly the state of the game 300, such as some or all of the game variables, for recreating a particular game state. The one or more gaming machines 402 are each further operable to capture a game-continuation sign 408, and continue conducting the game based on the game-continuation sign 408. The game-continuation sign 408 is related to the game-state-retention sign 406. In one example, they may be the same sign. In other examples, described further below, the game-continuation sign 408 may be modified, and hence different, based on the game-state-retention sign 406. Apart from basing on the current state of the game 300, the game-state-retention sign 406 and game-continuation sign 408 may be generated based on the game title. For example, the signs 406 and 408 may each include a sign portion associated with the game title.

Figure 5:
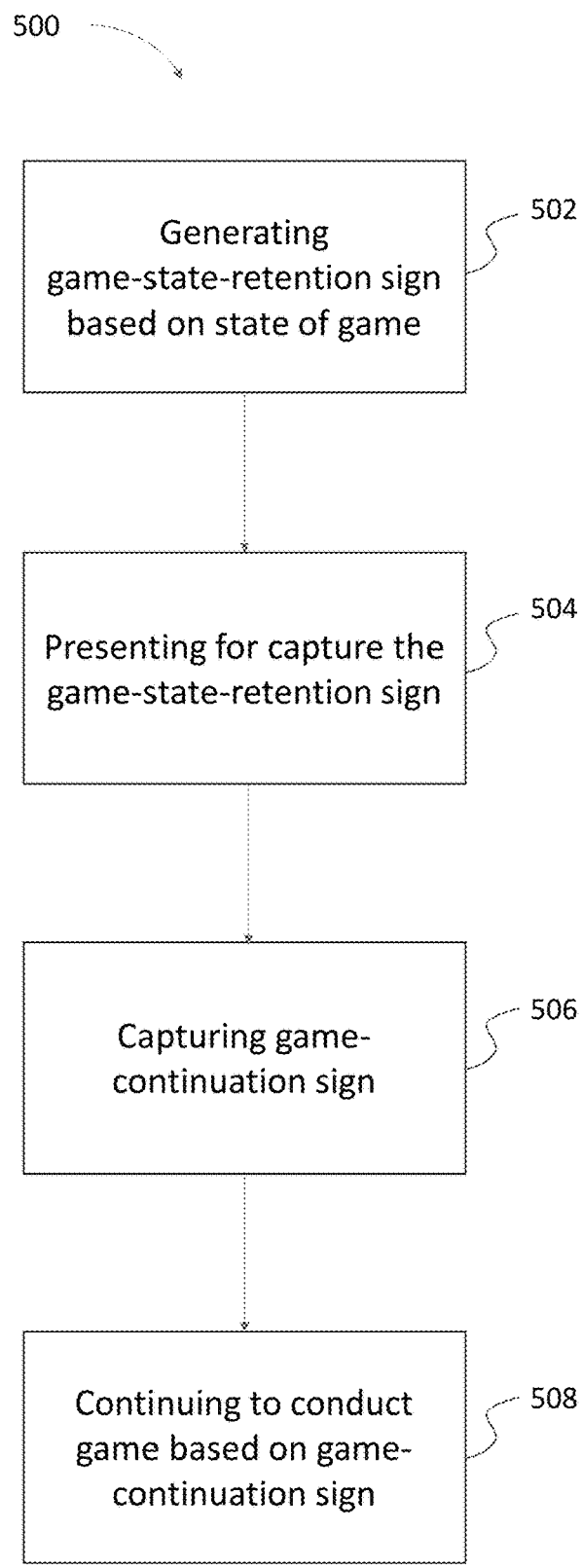
FIG. 5 illustrates an example of a method of game state retention and game continuation executed by one of the one or more gaming machines in FIG. 4.

As illustrated in FIG. 5, the one or more gaming machines 402 are configured to execute a method 500 of game state retention and game continuation. The method 500 includes, at a first gaming machine 402A, the step 502 of generating the game-state-retention sign 406. The step 502 may be responsive to activation of a "save game" function, for example by pressing of a button or selection of an icon, on the first gaming machine 402A. The method 500 further includes, at the first gaming machine 402A, the step 504 of presenting for capture the game-state-retention sign 406. In cooperation, the game-state retention sign 406 may be captured by the player device 404, following execution of a method 600 (described below) by the player device 404. The method 500 further includes, at the first 402A or a second gaming machine 402B, the step 506 of capturing a game-continuation sign 408 related to the game-state-retention sign 406, and the step 508 of continuing to conduct the game based on the game-continuation sign 408. The step 506 may be preceded by activation of a "load game" function, for example by pressing of a button or selection of an icon, on the first gaming machine 402A or the second gaming machine 402B. The activation of the "load game" function may in turn activate the sign capturer 402-C of the relevant gaming machine 402. Alternatively, the sign capturer 402-C may be active at all times during operation of the gaming machines 402, ready to capture any game-continuation sign 408 presented to it, without the need for separately activating the sign capturer 402-C.

Figure 6:
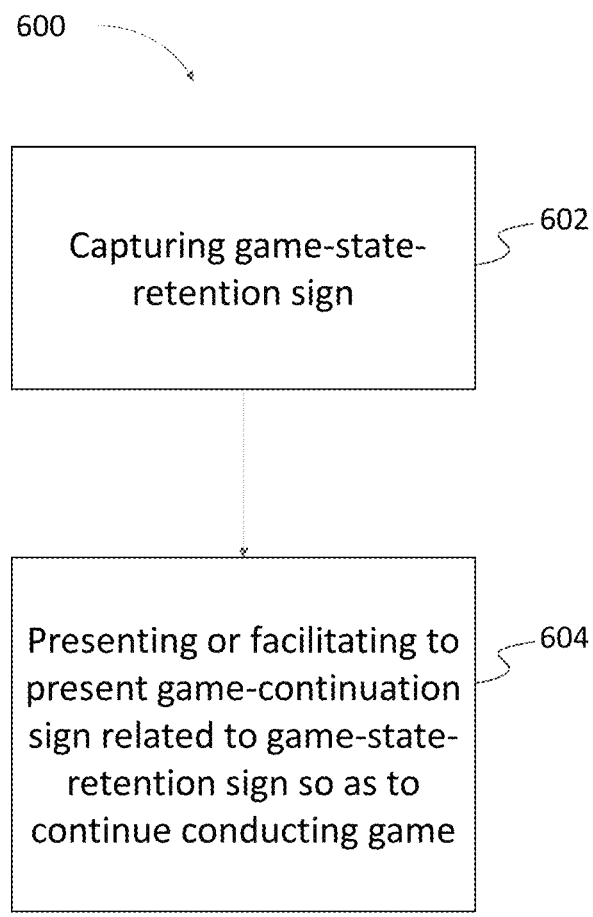
FIG. 6 illustrates an example of a method of game state retention and game continuation executed by the player device in FIG. 4.

In cooperation, the player device 404 is operable to capture the game-state-retention sign 406 presented at one of the one or more gaming machines 402, and present (or facilitate to present) the game-continuation sign 408 to the one or more gaming machines 402 so as to continue conducting the game on the, or another, gaming machine 402. As illustrated in FIG. 6, the player device 404 is configured to execute a method 600 of game state retention and game continuation. The method 600 for the player device 404 includes, at the player device 404, the step 602 of capturing the game-state-retention sign 406 presented at a first gaming machine 402A distinct from the player device 404. The method 600 further includes, at the player device 404, presenting (or facilitating to present) the game-continuation sign 408 related to the game-state-retention sign 406 to the first gaming machine 402A or a second gaming machine 402B so as to continue conducting the game on the first gaming machine 402A or a second gaming machine 402B. The game-continuation sign 408 may be presented by the same player device 404 that captured the game-state-retention sign 406. Alternatively, to facilitate another device (not shown) to present the game-continuation sign 408, the player device 404 may be configured to update the other device, or otherwise allowed access by the other device, to obtain the game-state retention sign 406 or the game-continuation sign 408. In one example, the player device 404 may be the player's mobile phone, whereas the other device may be the player's tablet device, synchronised via a common cloud service to have access to whatever signs are accessible to the player device 404.

Game State Retention and Game Continuation

Figures 7A, 7B:
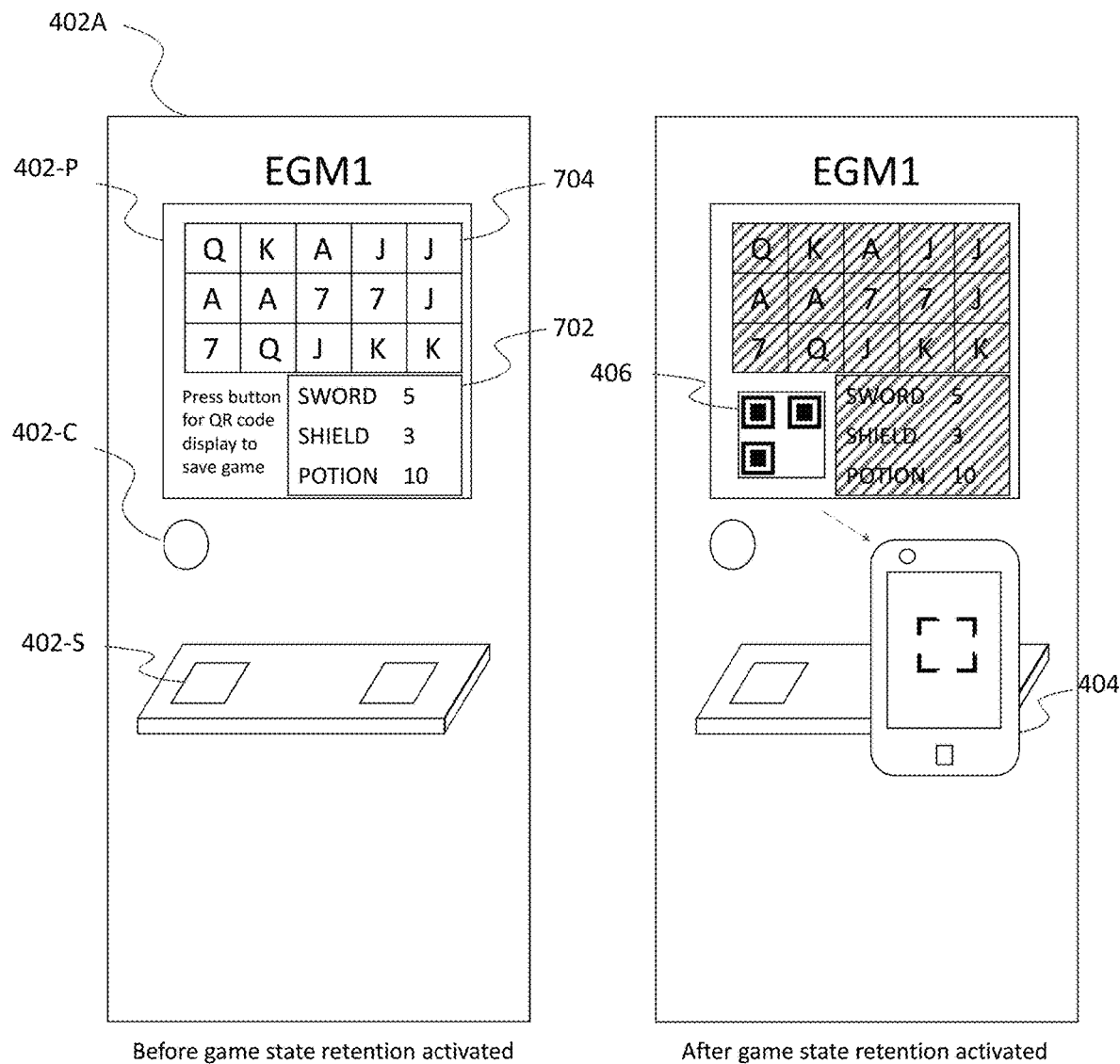
FIGS. 7A and 7B illustrate schematically an example of information displayed on a gaming machine before and after, respectively, the activation of game state retention function.

In one arrangement, the gaming machines 402 are each configured to receive an input to facilitate game state retention. For example, the gaming machine 402A includes a game retention button 402-S, which upon activation facilitates execution of steps 502 and 504 of method 200, that is, generating the game-state-retention sign 406 based on a current state of the game and presenting the game-state-retention sign 406 for capture. FIGS. 7A and 7B illustrate schematically an example of information displayed on the sign presenter 402-P before and after the activation, respectively. The game state may be influenced by some or all of the game variables. For example, for a game including game play elements of item collection, a game variable includes the inventory 702 of items collected during the course of the current gaming session (and accumulated in any previous gaming session(s)). As an additional or alternative example, for a game involving spinning and stopping of rotatable reels (be it actual or stimulated), a game variable includes collected symbols and/or the displayed outcome of the stopped reels 704. In one example, the game-state-retention sign 406 is configured to be presented for a preset time period or until another input (e.g. pressing of the game retention button 402-S again) is received. A player may therefore use the player device 404 to capture the presented sign 406, as further exemplified below and illustrated in FIGS. 8 and 11. In connection with the completion of the presentation of the game-state-retention sign 406, the current game session may be terminated, for example with item inventory 702 and stopped reels 704 disabled or ceased to be displayed, such as that illustrated in FIG. 7C. The game session termination prevents, if so desired by the venue operator or regulators, a single game state from being utilized by multiple players who may not have contributed to the generation of the game state, hence potentially increasing the operating RTP (return to player) percentage for the game where attributes of the game state may impact the prize outcomes of the game.

Figure 8A:
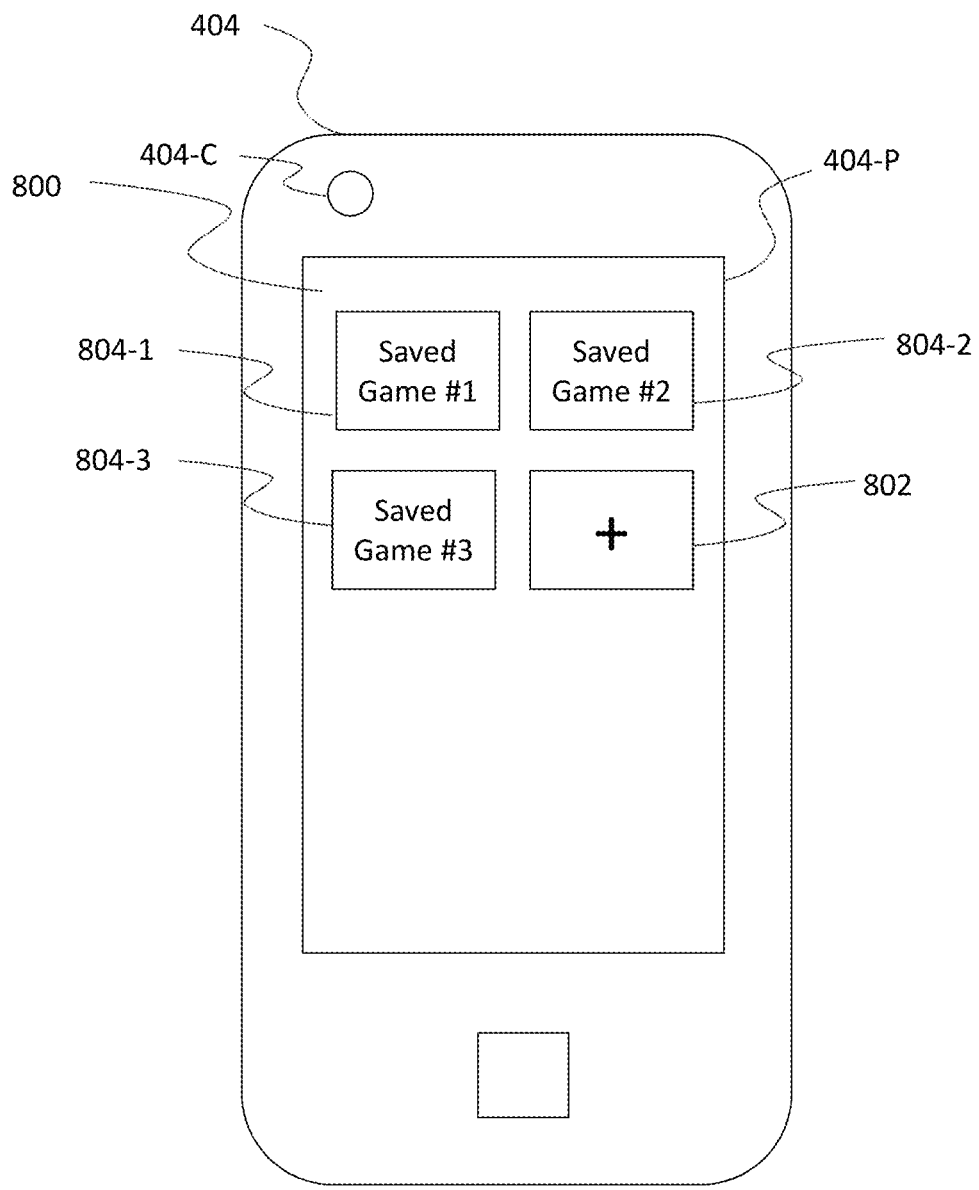
FIG. 8A illustrates schematically a layout of a games interface on the player device for selecting game state saving and loading.
Figure 8B:
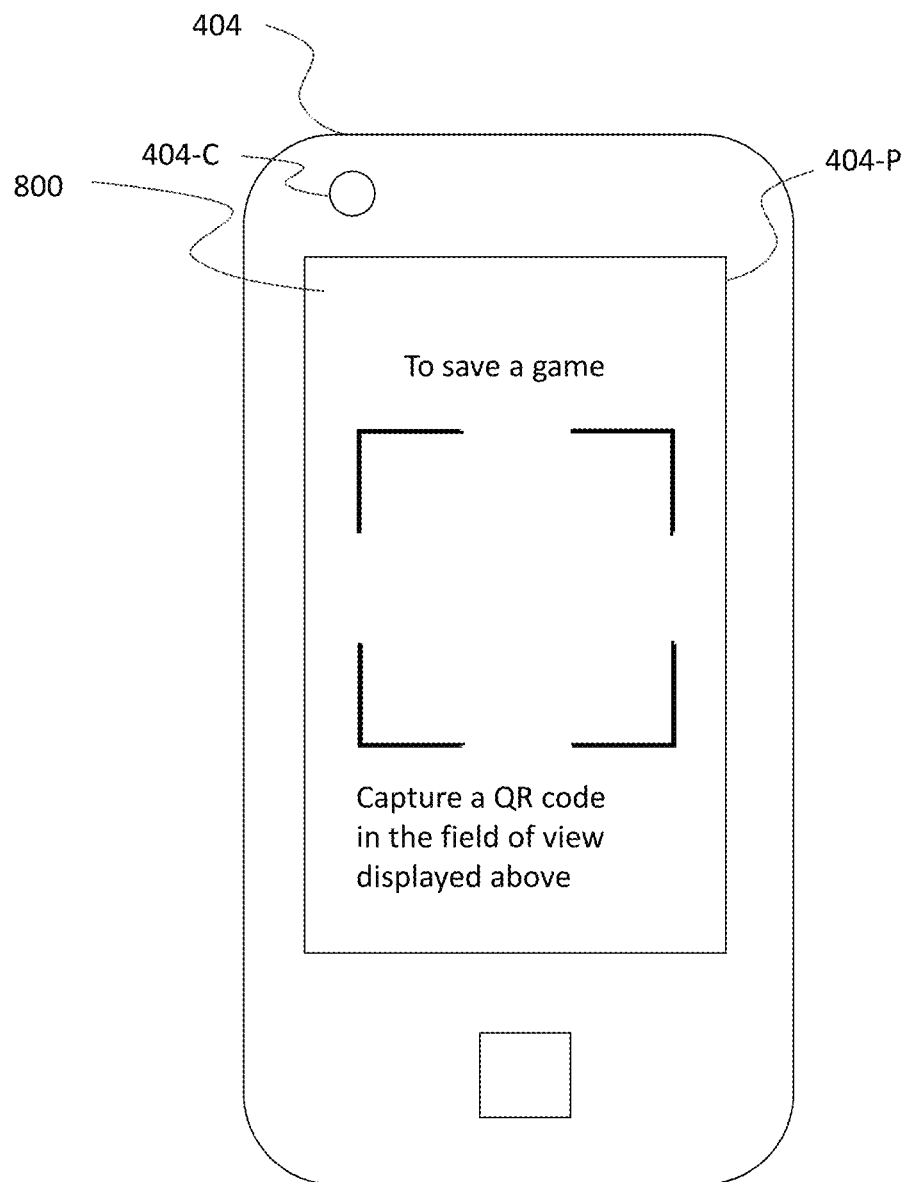
FIG. 8B illustrates schematically a layout of the games interface on the player device for saving a game state.

In one arrangement, as illustrated in FIG. 8A, the player device 404 is configured to present a games interface 800 on the presenter 404-P. The presenter 404-P may be a touch screen configured to display information and receive a touch input for selecting displayed information. The games interface 800 may be part of a dedicated software program or an "app" (e.g. an $^{iOS}$® app or an Android® app) installed on the player device 404. In one configuration, the games interface 800 may include a game state retention icon 802, which upon selection facilitates execution of step 602 of method 600, that is, capturing the game-state-retention sign. For example, as illustrated in FIG. 8B, selection of the game saving icon 802 causes activation of the sign capturer 404-C (e.g. camera app) of the player device 404 to enable a player to capture a game-state-retention sign. Where the sign is a QR code, the camera app may be configured to continually capture images until a captured image correspond to a recognisable QR code. Once the recognisable QR code is captured, the sign may be saved in the app in its captured form (i.e. unchanged from the presented sign) or modified form (e.g. changed by adding or removing tags, such as time stamps or player device identifier). Where the sign is to be modified, the player device 404 may be configured, such as by the app, to modify the captured sign. The modification may be done before saving the sign or after loading the saved sign. Further examples on sign modification are discussed below.

Figure 8C:
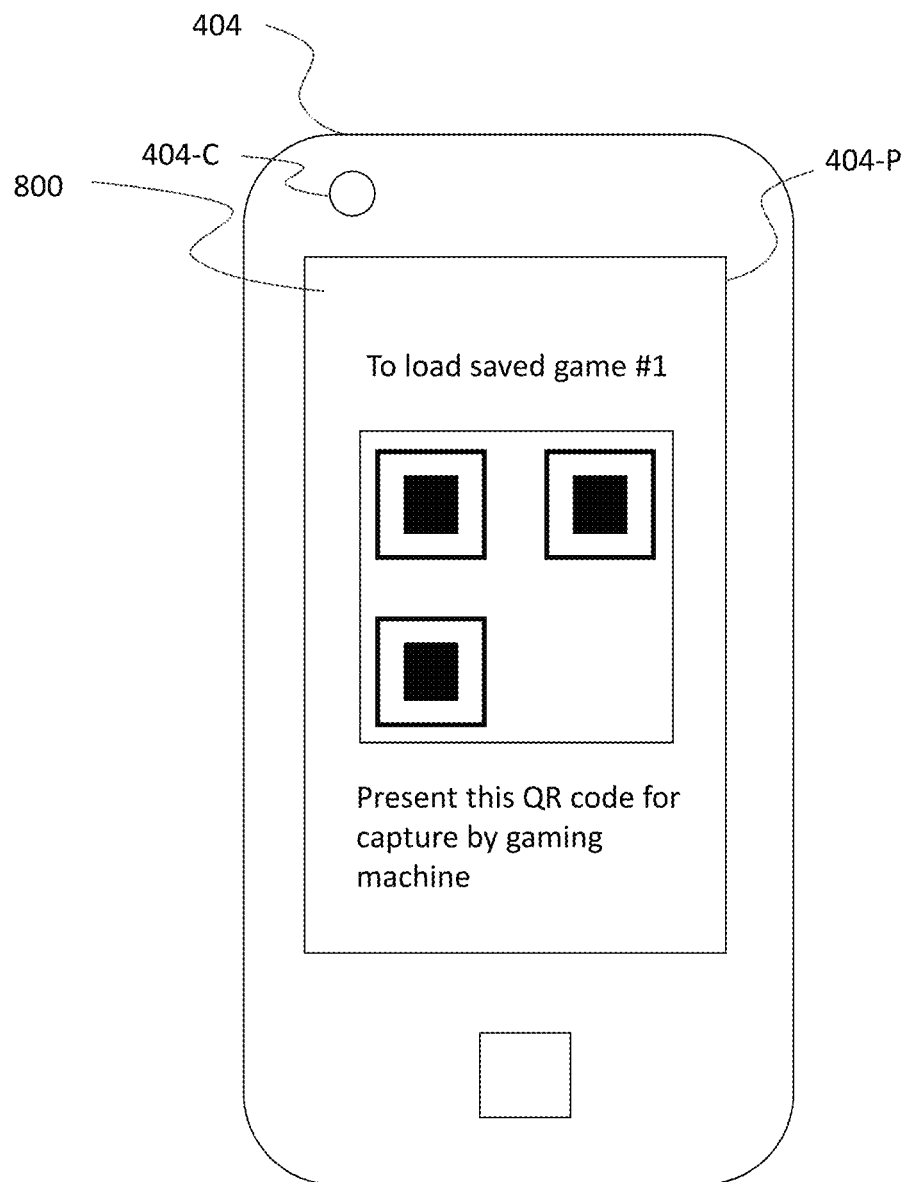
FIG. 8C illustrates schematically a layout of the games interface on the player device for loading a game state.

In one configuration, the games interface 800 may include one or more saved game icons (e.g. 804-1, 804-2 and 804-3, or collectively or individually 804), each representing a retained game state corresponding to a captured game-state-retention sign accessible by the player device 404. Each saved sign is in the form of a player-selectable icon. Alternatively, a saved game icon may correspond to one captured by another player device, and made available (e.g. via a synchronization process) for selection on the player device 404. The one or more saved game icons 804 each, upon selection, facilitate execution of step 604 of method 600, that is, presenting or facilitating to present a game-continuation sign to continue conducting the game based on the retained game state. For example, as illustrated in FIG. 8C, selection of the saved game icon 804-1 causes the sign presenter 404-P (e.g. a touch screen) of the player device 404 to present a game-continuation sign 408 relating to the game-state-retention sign 406 corresponding to a particular retained game state represented by the saved game icon 804-1.

In one arrangement, the gaming machines 402 are each configured to receive an input to facilitate game continuation. For example, the gaming machine 402A includes a game continuation button 402-L, which upon activation facilitates execution of steps 506 and 508 of method 200, that is, capturing the game-continuation sign 408 and continuing to conduct the game from the retained game state based on the game-continuation sign. FIGS. 7C and 7D illustrate schematically an example of the gaming machine 402-1 before and after the game continuation activation, respectively. Activation may include activation of a QR code scanner in the sign capturer 402-C. In this example, FIG. 7C illustrates that no game is being conducted on the gaming machine 402A. Responsive to successful capture of the game continuation sign 408, the gaming machine 402A reverts to the previously retained game state based on the captured sign 408, as shown in FIG. 7D. In other examples, if a game is already being conducted on the gaming machine 402A (not shown), upon successful capture of the game continuation sign 408, the gaming machine 402A is configured to determine from which of the current game state and the game state associated with the game continuation sign 408 should be continued to be conducted. In one instance, the gaming machine 402A makes the determination based on a comparison of the two game states, further exemplified below and illustrated in FIG. 12.

The game-state-retention sign 406 and the game-continuation sign 408 may be the same or a different sign. Where they are the same, the player device 404 may simply store the game-state-retention sign 406 upon capture, and retrieves it for presentation as the game-continuation sign 408. For example, where the sign includes a QR code, the gaming machine(s) 402 may display the QR code via an electronic display for capture and storage by the player device 404. The player device 404 may in turn retrieve and display the stored QR code without modification. The player device 404 may be configured to access storage to store and retrieve the game-state-retention sign 406. The accessible storage may be local to the player device 404, such as flash memory or ROM, or external to the player device 404, such as cloud storage. Alternatively, where the game-state-retention sign 406 and the game-continuation sign 408 are different, the player device 404 may generate for presentation the game-continuation sign 408 based on the game-state-retention sign 406. For example, the player device 404 may generate a modified QR code by modifying an end tag of the original QR code.

Figure 8D:
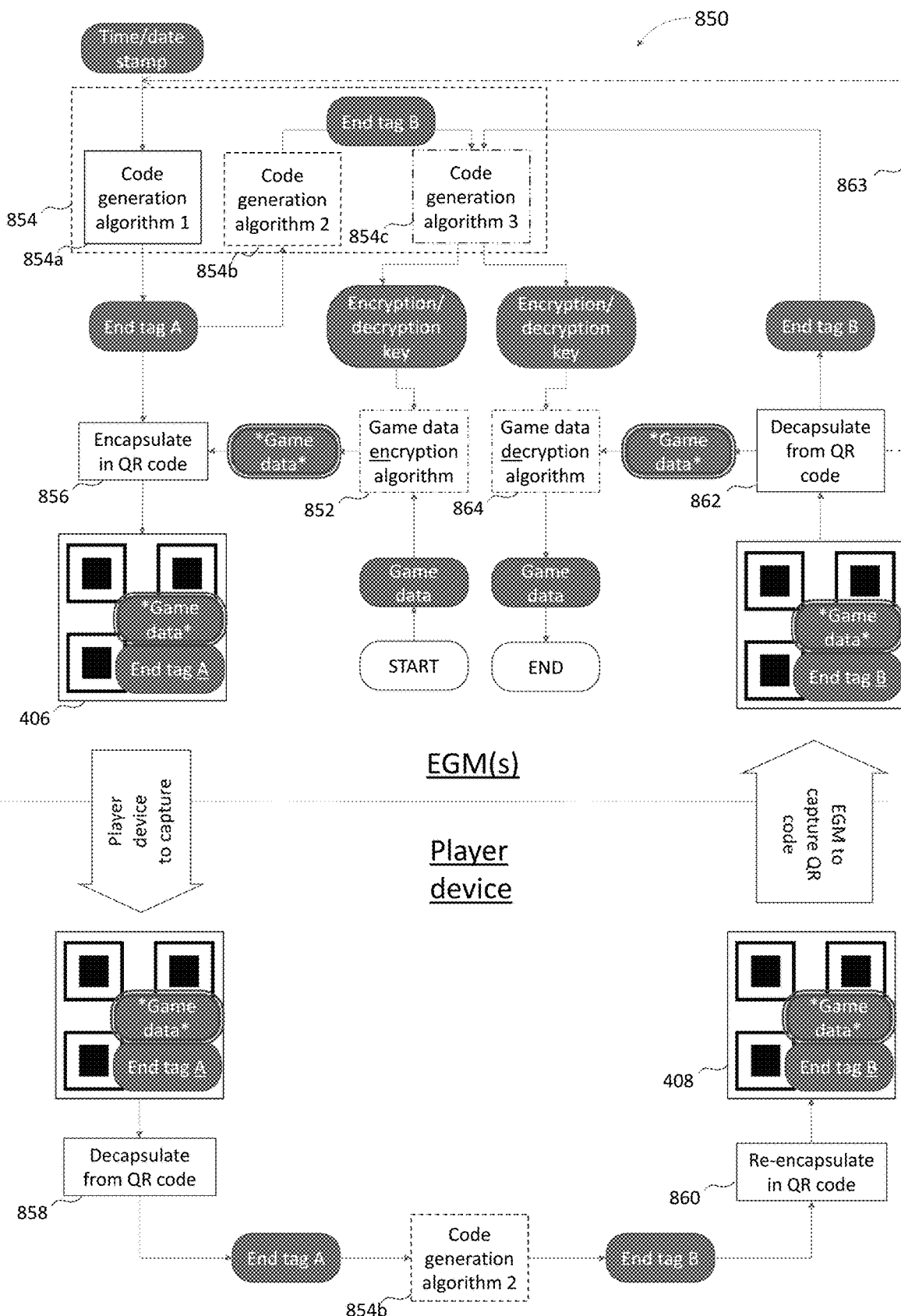
FIG. 8D illustrates schematically an example process of encrypting a game state retention sign and validating and decrypting a game continuation sign.
Figure 9:
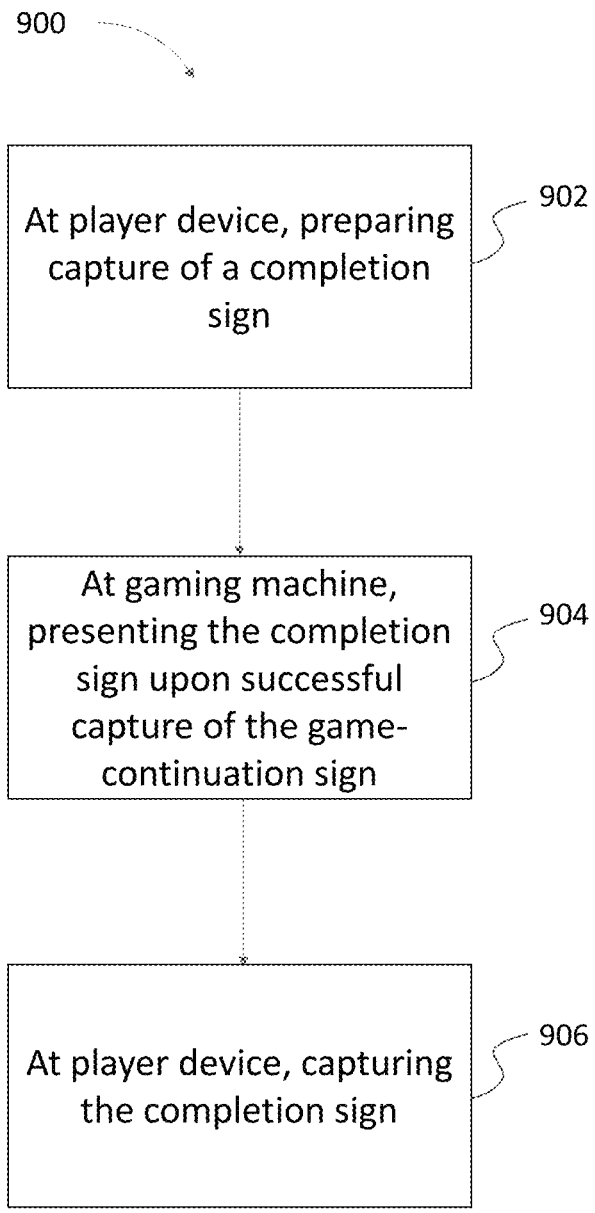
FIG. 9 illustrates an example of a handshaking process between the player device and a gaming machine to indicate completion of the method illustrated in FIG. 5.

As illustrated in the flow chart of FIG. 8D, the end tag may be used for sign validation purposes. The process 850 illustrates an example of encrypting a game-state-retention sign 406 and decrypting and validating a game-continuation sign 408. At a gaming machine 402, the process 850 includes the step 852 of encrypting game variables defining the current game state (or "game data" as illustrated) using an encryption algorithm. The encryption algorithm encrypts the unencrypted game data based on an encryption key to generate encrypted game data (or "*game data*" as illustrated). The process 850 further includes the step 854 of generating the encryption key, which generation comprises three code generation algorithms 854a, 854b and 854c. The first code generation algorithm 854a generates a first code (herein "end tag A" or ETA) based on a date/time, which is provided by the gaming machine 402 and forms part of the game-state-retention sign 406. The second code generation algorithm 854b generates a second code (herein "end tag B" or ETB) based on ETA. The third code generation algorithm 854c generates a third code, which is the encryption key. The process 850 further includes the step 856 of encapsulating the encrypted game data in a game-state-retention sign 406, such as a QR code, for a player device to capture. As part of the encapsulation step 856, the game-state-retention sign 406 also includes a header portion (not shown) and the ETA generated by the first code generation algorithm 854a. The header portion and the end tag portion are generally not encrypted so as to allow validation of the sign 406. The steps 852 to 856 take place at the gaming machine 402.

At the player device 404, the process 850 further includes the step of 858 of decapsulating the captured game-state-retention sign 406 to extract the encapsulated ETA. The process 850 further includes separately generating the ETB at the player device 404, based on the extracted ETA and using the second code generation algorithm 854b. The second code generation algorithm 854b may be made known to the player device 404 by a dedicated app. On the contrary, the first and the third code generation algorithms 854a and 854c are not made known to the player device 404. The process 850 further includes the step 860 of re-encapsulating the separately generated ETB in a game-continuation sign 408, such as a QR code, for the (or another) gaming machine 402 to capture. The steps 858 to 860 take place at the player device 404.

Back at the (or the other) gaming machine 402. The process 850 further includes the step 862 of decapsulating the captured game-continuation sign 408 to extract the encapsulated ETB and encrypted game data. The process 850 further includes the step 864 of decrypting the encrypted game data based on a decryption key. The decryption step 864 is the reverse process of the encryption step 852. The process 850 includes generating the decryption key, which is related to the encryption key, based on the extracted ETB using the third code generation algorithm 854c. Where there is no tampering to the game-state-retention sign 406 or the game-continuation sign 408, the decrypted game data is expected to be the same as the unencrypted game data. Otherwise, the decrypted game data is expected to be different from the unencrypted game data, and potentially corrupted or undecipherable by any of the gaming machines 402. In some arrangements, prior to decryption step 864, the process 850 may include validating the game-continuation sign 408 at the gaming machine 402, by further generating the ETB based on the date/time stamp extracted 863 from the header portion of the captured game-continuation sign 408, using the first and second code generation algorithms 854a and 854b. A match between the extracted ETB and the further generated ETB indicates a valid game-continuation sign 408, or an invalid one otherwise.

The process 850 aim to deter any unauthorised creation of QR codes, such as those not achieved through play of the game 300. To further prevent replication of a QR code (e.g. via a photograph rather than the games interface 800 of the dedicated app) created through actual game play for subsequent re-use another or multiple times, the dedicated app may be configured to restrict a time-limited display of the game-continuation sign 408 on the games interface 800, once step 604 (i.e. presenting or facilitating to present a game-continuation sign) of method 600 has commenced, for example, by selection of one or more saved game icons 804. Alternatively or additionally, the dedicated app or the EGM 402 may be configured to invalidate saved game-continuation sign 408 after an expiry period associated with the sign. The expiry period may be a set period, such as 1 month after the timestamp in the header (see below on information contained in a sign).

The player device 404 is intended to be used for game state retention without conducting the game 300. In these arrangements, the player device 404 is useful as a catalogue for suspending and resuming the game at gaming machines across multiple gaming sessions. In effect, the game 300 may be suspended at a gaming machine, and be later resumed at the same or a different gaming machine. Further, the different gaming machine may be deployed at a different venue operated by a different venue operator. Since the sign contains the state of the game 300, there are no or reduced requirements to retrieve or transfer game variables even if the game 300 is to be resumed at a different venue. A player may have multiple player devices. Where one player device has captured a game-state-retention sign, the rest of the multiple player devices may be synchronised or otherwise updated to have access to the game-state-retention sign. The access may be via a cloud server or direct download.

Controlling Use and Re-Use of Signs

In one arrangement, both or either of the game-state-retention sign 406 and the game-continuation sign 408 may each be an animated (or dynamic) QR code. An animated QR code includes a series of static QR codes displayed sequentially. The sequential display may include refreshing to the next static QR code at a regular or irregular interval. Further, the sequential display may include recycling a set of static QR codes in the same or different orders. Use of an animated QR code generally achieves higher data storage capacity than, for example, a static QR code of the same pixel size. Further, use of an animated QR code frustrates efforts in duplicating or copying (e.g. by taking a still image) of the saved sign which would otherwise be straightforward if using a static QR code.

In one arrangement, step 604 of method 600 may include any one or more a time-limited, time-based expiring and self-expiring operation. In a time-limited operation, a saved game icon 804 in the games interface 800 upon selection may trigger the start of a predetermined time period (e.g. 30 seconds) within which the corresponding game-continuation sign 408 is allowed to be presented on the sign presenter 404-P. At the expiry of the predetermined time period, the game-continuation sign 408 ceases to be presented and become irretrievable for further presentation. In a time-based expiring operation, a game-continuation sign 408 may be invalidated after a set period, such as 30 days from a date/time stamp contained in the game-continuation sign 408. Where the date/time stamp is used in the generation of the end tag for validation purposes, as illustrated in FIG. 8D, it will not be possible to simply modify the date/time stamp associated with the encryption/decryption key. In a self-expiring operation, a saved game icon 804 in the games interface 800 upon selection may trigger a handshaking process 900 to indicate successful completion of the step 508 of method 200. At its successful completion, the game-continuation sign 408 ceases to be presented and become irretrievable for further presentation (e.g. with the corresponding saved game icon 804 removed, disabled or otherwise unavailable in the games interface 500). The handshaking process 900 may include (a) the step 902, at the player device 404, of preparing capture (e.g. activating a camera module) of a completion sign signaling successful capture of the game-continuation sign 408 by the gaming machine 402, (b) the step 904, at the gaming machine 402, of presenting the completion sign upon successful capture of the game-continuation sign 408, and (c) the step 906, at the player device 404, of capturing the completion sign. Handshaking steps 902 and 904 may occur in a reverse order, or at the same or overlapped times. In this arrangement, the time-limited and/or self-expiring operation frustrates efforts in duplicating or copying (e.g. by taking a camera image) of the sign. The irretrievable disposal facilitates a one-time use of each saved sign and prevents re-use of each saved sign. Accordingly, subsequent use of a saved sign may be restricted upon presentation and/or capture of the game-continuation sign 408 by a gaming machine 402. The restriction ensures that the saved sign carrying the game state information can only be used once, to avoid player creating parallel gaming instances, forking or diverging from a single game state. Such parallel gaming instances would otherwise potentially influence the operating return-to-player (RTP) of the EGM(s).

Other Types of Machine-Recognisable Signs

It should be appreciated that a machine-recognisable sign need not be a visual sign, as exemplified above. Other suitable machine-recognisable signs may include any form of contactless transfer of information. Contactless transfer of information is particularly suited to highly regulated environment where, for example, regulations inhibits certain form of information flow to and/or from the gaming machines. As an example, the sign is an audio sign, such as a tune, in which case the sign capturer may be microphone and the sign presenter may be a loudspeaker. As another example, the sign may be a digital sign, in which case the sign capturer may be an NFC reader and the sign presenter may be a reconfigurable RFID tag. It also should be appreciated that description herein relating to visual signs is, with minor modifications, applicable to other signs such as audible or digital signs.

Information Contained in a Sign

Figure 10:
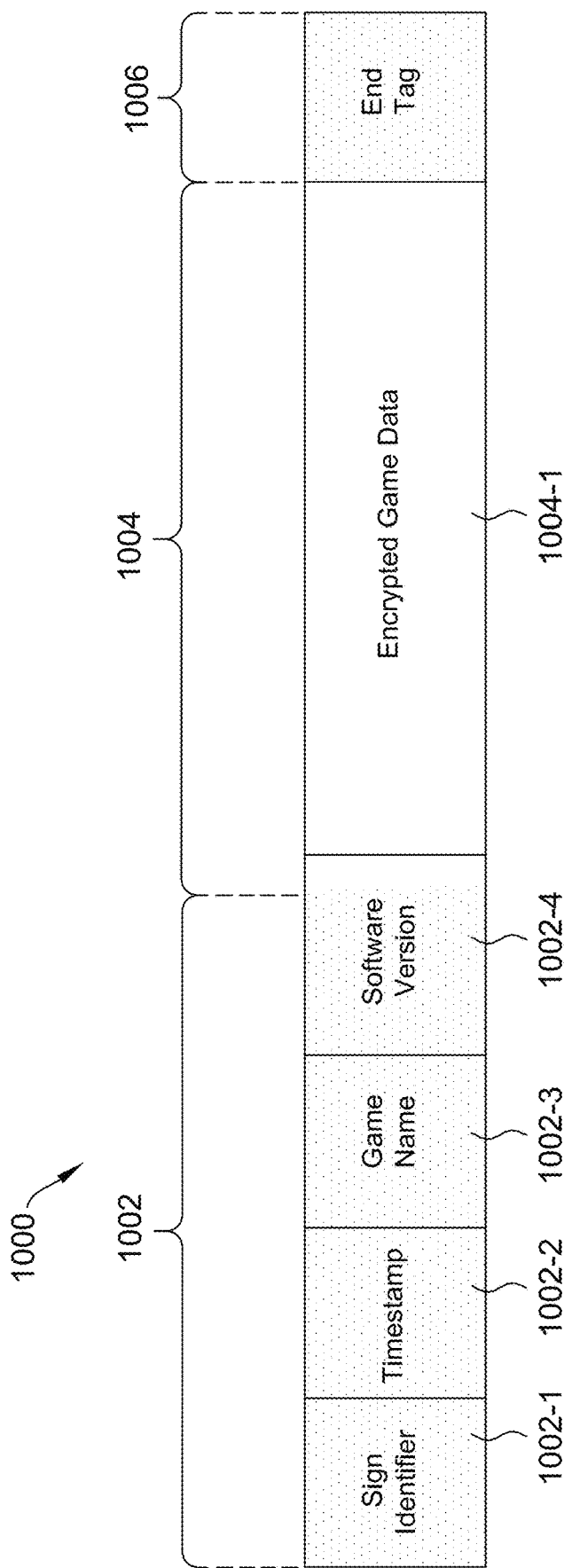
FIG. 10 illustrates schematically an example of game state information contained in a machine-recognisable sign.

FIG. 10 illustrates schematically an example of the game state information 1000 contained in a machine-recognisable sign associated with a game state. The game state information 1000 at least partly contains the state of the game. The game state information 1000 is illustrated in a data packet representation with blocks of linear data, however other representations are possible.

In one arrangement, the information game state 1000 includes a header portion 1002, a payload portion 1004 and an end tag portion 1006. In this arrangement, the information contained in the header portion 1002 is readable or recognisable by both the gaming machines 402 and the player device 404. In contrast, the information contained in the payload portion 1004 is readable or recognisable by the gaming machines 402 but not the player device 404. In one example, only specific components of the gaming machines 402, such as the game controller but not the platform controller, may be configured to be able to read or recognise the data in the payload portion 1004. In general, the game controller is configured to control the game play (e.g. player-selectable inputs, symbol selections, items collection, etc.) presented on a gaming machine, whereas the platform controller is configured to control the hardware and their operation (e.g. buttons, ticket printer, card reader, screen brightness, QR code scanner, communications with external systems (jackpot controllers, site controllers, central monitoring systems etc), regulatory event logging (door open events, game play statistics, fault conditions etc) and so on. The end tag portion 1006 may be absent from a game-state-retention sign 406, but may be added to become part of a game-continuation sign 408. Alternatively, the end tag portion 1006 may already be present in a game-state-retention sign 406, but may be modified in the game-continuation sign 408.

In one example, the header portion 1002 includes a type identifier 1002-1 (e.g. in alpha-numerical form), the game title identifier 1002-3 (e.g. in text or alpha-numerical form), game software version 1002-4 (e.g. in alpha-numerical form) and a date/time stamp 1002-2. The type identifier 1002-1 allows the platform controller to determine how to process or use the information contained in the sign (e.g which system or game module to pass it to). For example, it may include a manufacturer identifier component and a "game data" identifier to distinguish a QR code that is being used to relay game data from one that is being used for another purpose such as to configure a game for a venue or to provide free promotional play. For example, "ARIGD" may denote an Aristocrat™ game data QR code whereas "ARICN" may denote an Aristocrat™ game configuration code and "ARIFP" may denote an Aristocrat™ free play voucher. The game title identifier 1002-3 may be used by the player device 404 to distinguish one game title from another and display the name of the game, upon saving, on the games interface 800. The game software version 1002-4 may be used by the gaming machines 402 to determine whether the game data is compatible with the particular version of the game title being run by the gaming machine 402. The date/time stamp 1002-2 may be used by the player device 404 to display the save date and save time of the saved game on the games interface 500 as well as to distinguish the game data from game data that may already be stored by the player device 404 for the same game title and/or warn the player if they are about to overwrite data for the same game title. Further, the date/time stamp 1002-2 may be used in the process 850 and as illustrated in FIG. 8D.

Two game states may be recognised as belonging to the same or different game titles based on information included in the header portion 1002, as well as depending on whether it is a gaming machine 402 or a player device 404 recognising the game titles. For example, a gaming machine may recognise two gaming sessions as belonging to different game titles if they are associated with the same game title identifier 1002-3 but different game version number 1002-4. This may be useful where not all gaming machines have the same run-time capabilities (e.g. having any one or more of different software configurations, different platforms, different hardware, different configured display formats, etc.). Two processes 1100 and 1200 are described further below for handling the saving (or loading) of state of a game of a title that is already saved on the player device 404 (or displayed on the gaming machine 402).

In one example, the payload portion 1004 includes game variables 1004-1 of the game. For instance, the game variables 1004-1 may include metamorphic game attributes (e.g. number of collected wild symbols, container, which features have been played, how much ammunition is remaining, which weapons are in the inventory), and/or player-selected game state attributes (selected avatar, avatar skins, colour of the background, currently selected bet). Variables of the game may include skill-based variables, whether or not they affect the expected or operating return-to-player (RTP). Skill-based variables are associated with values or information that are based at least partially on the player's skill or choice. In other words, skill-based variables are not based entirely on randomness. For example, a skill-based variable may be a player's item inventory representing the collectable items selectively collected, constructed or purchased by the player in previous gaming session(s). As another example, a skill-based variable may be a player's exploration summary representing any one or more of the explorable regions, terrains, tasks, challenges, themes, and levels that has/have been selectively explored by the player in previous gaming session(s).

In one example, the game variables 1004-1 includes information for a gaming machine 402 to recreate the game in a particular game state. The game variables may include data associated with item inventory, such as the tool(s) collected and/or purchased. The game variables may include data associated with the game progress, such as completion or non-completion of each of the tasks, completion or non-completion of each of the ultimate challenges, and the availability or non-availability of each of the sub-themes. Some of the game variables may be used as a basis for determining whether one game state is more or less advanced than another game state. The game variables for different game titles will be different in accordance with the way the different games work. For example, one game title may store an inventory of tools whereas another game title may store which features have been activated.

In an expected use case, the particular game state is based entirely on the game variables. By containing all game variables in the machine-recognisable sign, the gaming machine obtaining the captured sign can be configured to continue conducting the game without the need for additional retrieval of game variables via back-end infrastructure, such as a player-tracking system, the internet or a private network. The removal or reduction of reliance on back-end information transfer facilitates players to suspend and continue games across independently operated venues which disallow or are otherwise unable to facilitate transfer of game state information. In some instances, it also allows quicker load time.

Encoding

In one arrangement, at least some of the information of the machine-recognisable sign may be encoded, such as some or all of the game variables. Such encoding is in addition to any encryption applied to the generation of the game-state-retention sign or game-continuation sign described above.

For example, the game title identifier may be non-encoded and hence readable by the player device 404. However, some game variables (e.g. item inventory) may be encoded and hence non-recognisable by the player device 404. In this example, the game identifier is recognisable by both the gaming machines 402 and the player device 404, whereas the game variables are recognisable by the gaming machines 402 but not the player device 404. This configuration is intended to provide the player device 404 with sufficient information to create a catalogue of saved games with their corresponding retained game states, while improving security or reducing hacking by preventing the player device from being able to modify encoded game variables (e.g. to modify the item inventory).

In one arrangement, the encoding/decoding protocol is game-title-specific. For example, at least part of the game state information 1000, such as the game variables 1004-1, is generated based on a first encoding/decoding protocol for a first game title and based on a second, different encoding/decoding protocol for a second, different game title. With this arrangement, the developer or designer of a specific game has the flexibility to determine the encoding/decoding protocol in generating the machine-recognisable sign. For example, it may be determined that for a first game title, the first 8 bits of the game data represents the number of swords collected (i.e. allowing a maximum of $2^8=256$ swords), the next 9 bits of the game data represents the number of shields collected (i.e. allowing a maximum of $2^9=512$ shields), and the next 10 bits of the game data represents the number of magic potions collected (i.e. allowing a maximum of $2^{10}=1024$ magic potions). The game variables 1004-1 are non-decodable by the player device 404 but decodable by the gaming machines 402. It is envisaged that the player device 404 or the app implementing the game interface 500 is agnostic to the encoding/decoding protocol.

FURTHER EXAMPLES

Figure 11:
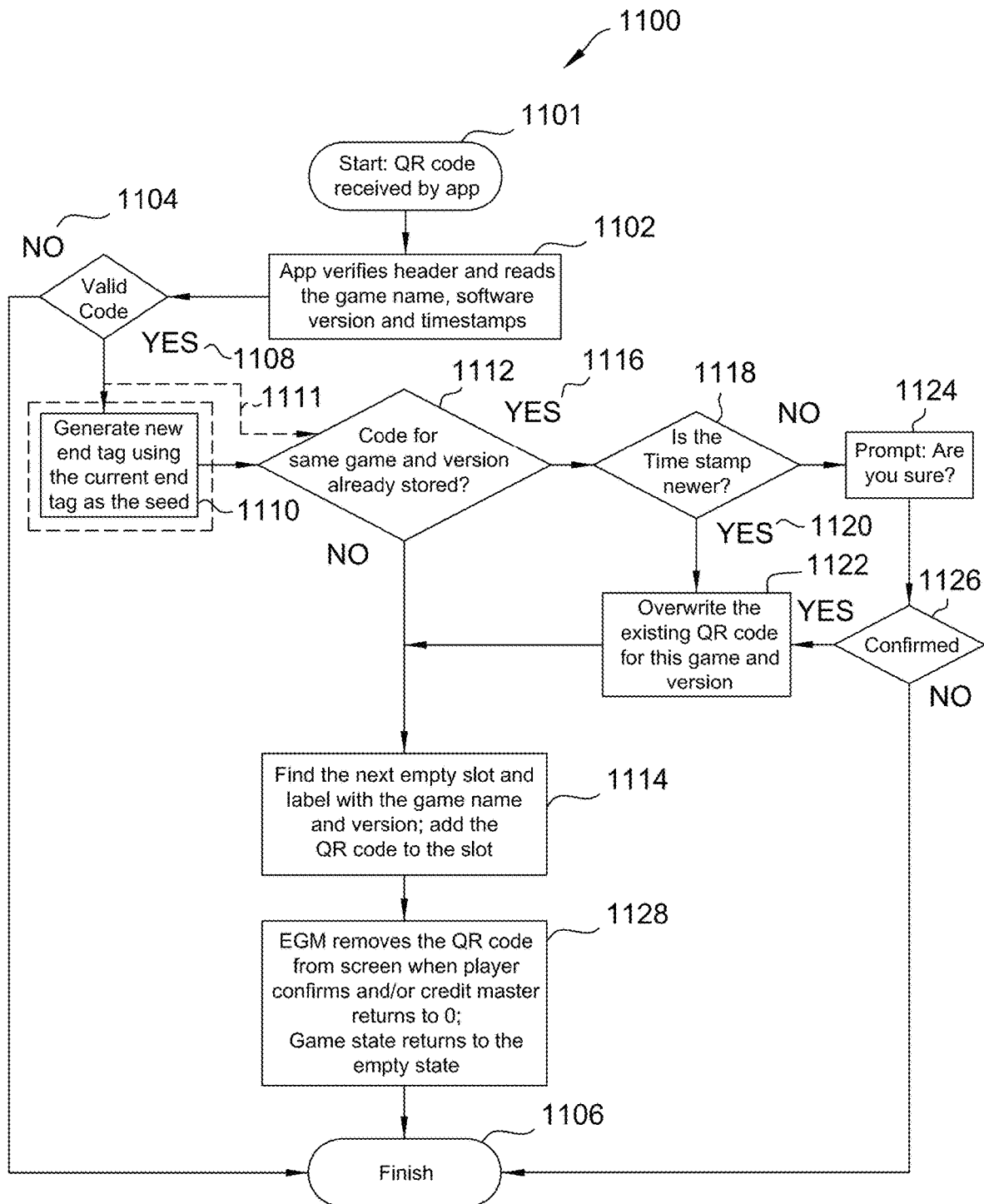
FIG. 11 illustrates a flow chart of an example game state saving procedure.

In one example of game saving procedure 1100, as illustrated in FIG. 11, the player device 404 (the installed app in this example) receives at step 1101 a game-state-retention sign 406 (a QR code in this example) captured by its sign capturer 402-P, the app at step 1102 determines the validity of the QR code 406 based on whether information contained in the header portion 1002 is recognisable. If the app does not recognise 1104 the information contained in the header portion 1002, it discards the QR code 406 as invalid and control returns to step 1106 to finish the gaming save procedure unsuccessfully. If the app recognises 1108 the information contained in the header portion 1002 (e.g. the type identifier 1002-1), the app further reads one or more of the game title identifier 1002-3, the game software version 1002-4 and the date/time stamp 1002-2 in the QR code 406. As an optional step 1110, which can in some examples be bypassed 1111 to reach step 1112, the app may add an end tag portion 1006, or modify any existing end tag portion 1006 by generating a new end tag portion based on the existing end tag portion 1006, as described above in other arrangements. If it is determined at step 1112 that there is no saved game 1113 with a matching game title identifier 1002-3 and game software version 1002-4 already stored or accessible by the app, the app facilitates storage 1114 of the QR code 406 or its modified counterpart. Upon storage, the games interface 800 may display the corresponding game title identifier (e.g. game title name) and the game software version in an available slot to indicate a new game being saved. After a preset time period or upon receipt of a player input on the gaming machine 402, the gaming machine 402 may remove 1128 the game-state-retention sign 406 from being presented and retuning control to step 1106 to finish the gaming save procedure successfully. Back at step 1112, if it is determined that there is 1116 a previously stored QR code with a matching game title identifier 1002-3 and version 1002-4, the app compares 1118 the date/time stamp 1002-2 with that of the previously stored QR code. If it is determined 1120 that the newly received QR code is newer (i.e. has a later date/time stamp 1002-4), then the app overwrites 1122 the previously stored QR code and stores the newly received QR code 406 (or its modified counterpart) following steps 1114, 1128 and 1106. Otherwise, the player device 404 displays 1124 a confirmation prompt for overwriting the previously stored QR code with the newly received QR code 406 (or its modified counterpart). If confirmed 1126 by the player, control follows steps 1122, 1114 and 1128, otherwise control returns to step 1106 to finish the game saving procedure 1100 unsuccessfully.

Figure 12:
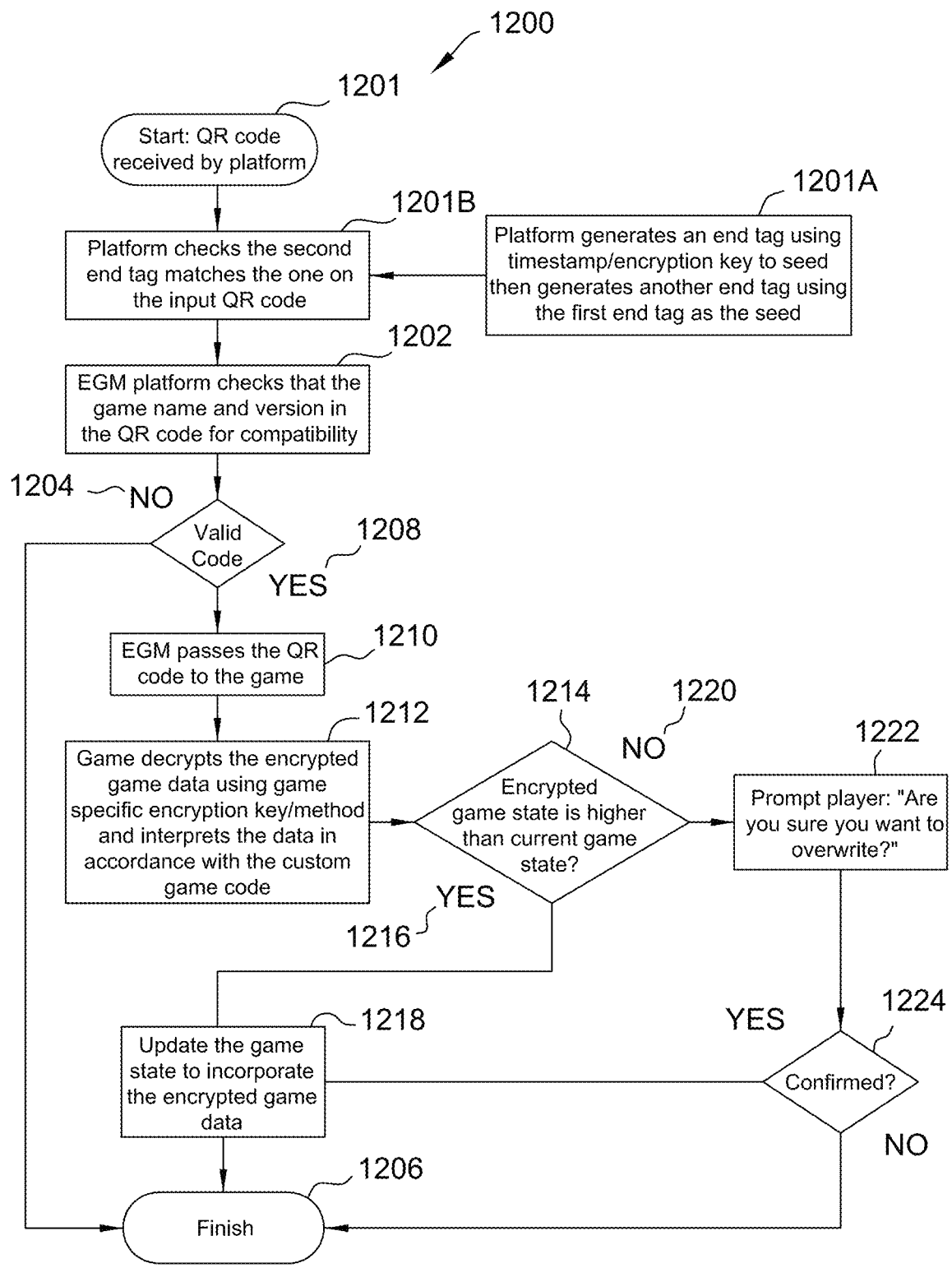
FIG. 12 illustrates a flow chart of an example game state loading procedure.

In one example of game loading procedure 1200, as illustrated in FIG. 12, a gaming machine 402 (the platform controller in this example) receives at step 901 a game-continuation sign 408 (a QR code in this example) captured by the sign capturer 402-C. At step 1201A, the platform controller generates an end tag A based on the time/date stamp contained in the header portion 1002 (e.g. following steps 862, 863 and 854a of the process 850), and subsequently generates an end tag B based on the generated end tag A (e.g. following step 854b of the process 850). At step 901B, the generated end tag B is compared for a match with the extracted end tag B from the captured game-continuation sign 408 (e.g. following step 862). A successful match indicates a valid game-continuation sign 408 or an invalid one otherwise. The platform controller then determines 1202 the kind of the QR code (e.g. game-continuation-related, machine-configuration-related) based on the header portion 1002. If the platform controller is unable 1204 to recognise information contained in the header portion 1002, it discards the QR code 408 as invalid and control returns to 1206 to finish the game loading procedure unsuccessfully. If the platform controller is able (not illustrated) to recognise the header portion 1002 as machine-configuration-related, it uses the QR code 408 accordingly (for example, a machine-configuration-related QR code could be read by the platform controller and used to configure a game after RAM clear for a specific jurisdiction or venue for a game technician to set up a game environment). If the platform controller is able to recognise the header portion 1020 as game-continuation-related (e.g. including a valid game name identifier 1002-3 as one of the preset list of game identifiers), the platform controller further determines the software version of the retained game state based on the version information 1020-4 in the header portion 1020 for compatibility with the software version on the gaming machine 402. If the platform controller determines 1208 that the QR code 408 is compatible with the software version of the gaming machine 402 (e.g. the same as or later than the software version of the retained game state), it passes 1210 the QR code 408 to the game controller, otherwise the platform controller causes the gaming machine 402 to abort with an "incompatible software version" error message. At step 1212, the game controller recreates a game state continuing from a previous gaming session based on the payload portion 1004 of the game state information 1000 contained in sign 408. To recreate the game state, the game controller having information about or access to the game-title-specific encoding protocol (and any encryption protocol) decodes (and decrypt if necessary) the payload portion 1004 to obtain at least some game variables. At step 1214, where a game is being conducted at the gaming machine 402, the game controller compares the game state of the current game with that of the recreated game. If the recreated game state is determined to be more advanced 1216 than the game state of the current game, the game controller at step 1218 reverts to, or updates the current game state to incorporate game variables in the recreated game state. The gaming machine then continues the game from the recreated game state, returning control to 1206 to finish the game loading procedure successfully. Back at step 1214, if the recreated game state is determined to be less advanced 1220 than the game state of the current game, the game controller displays 1222 a confirmation prompt for overwriting the current game with recreated game. Advancement in game state may be based on game state information 1000 such as time stamp 1002-4 in the header portion 1002, or completion of tasks or ultimate challenges contained in the game variables 1004-1 in the payload portion 1004. If confirmed 1224 by the player, control follows step 1218, otherwise skipping step 1218 and control returns to step 1106 to finish the game loading procedure 1200.

Now that arrangements of the present disclosure have been described, it should be apparent that the present disclosure, in at least some arrangements, provides the following:

It is not necessary for players to each carry a player-specific tracker. Instead, a player carries player device (e.g. their own mobile phone) configured to store the state of each game in the form of device-capturable and machine-readable signs.

A player carrying an appropriately configured player device (e.g. installed with a dedicated app) may continue games across different venues, even if the different venues have no connecting infrastructure.

The game-title-specific encoding/decoding protocol allows game developers or designers flexibility to deploy the present disclosure to different game titles with different game mechanics and different types of retrievable game states.

What is claimed is:

1. An electronic gaming device comprising:
at least one memory with instructions stored thereon; and
at least one processor in communication with the at least one memory, wherein the instructions, when executed by the at least one processor, cause the at least one processor to:
generate a game state image based on at least one game variable associated with a state of an electronic game, wherein the game state image encodes the at least one game variable; and
cause display of the game state image for capture by an electronic device associated with a player, wherein presentation of data associated with the game state image causes the electronic game to be resumed.

2. The electronic gaming device of claim 1, wherein the data is presented as at least one of the game state image or a game continuation image.

3. The electronic gaming device of claim 1, wherein the instructions further cause the at least one processor to:
receive the data associated with the game state image by decoding a game continuation image associated with the data; and
cause the electronic game to be resumed.

4. The electronic gaming device of claim 1, wherein presentation of the data to a different electronic gaming device causes the game to be resumed at the different electronic gaming device.

5. The electronic gaming device of claim 4, wherein the different electronic gaming device comprises at least one of a smart phone, a tablet, a laptop, or the electronic device associated with the player.

6. The electronic gaming device of claim 1, wherein the instructions further cause the at least one processor to cause display of the game state image to be removed based on at least one of a period of time passing or an input received at the electronic gaming device.

7. The electronic gaming device of claim 1, wherein the instructions further cause the at least one processor to generate the game state image in response to receiving an input to save the state of the electronic game.

8. The electronic gaming device of claim 1, wherein the instructions further cause the at least one processor to generate the game state image as further encoding at least one of a date, time, or encryption key.

9. At least one non-transitory computer-readable storage medium with instructions stored thereon that, in response to execution by at least one processor, cause the at least one processor to:
　generate a game state image based on at least one game variable associated with a state of an electronic game at an electronic gaming device, wherein the game state image encodes the at least one game variable; and
　cause display of the game state image for capture by an electronic device associated with a player, wherein presentation of data associated with the game state image causes the electronic game to be resumed.

10. The at least one non-transitory computer-readable storage medium of claim 9, wherein the data is presented as at least one of the game state image or a game continuation image.

11. The at least one non-transitory computer-readable storage medium of claim 9, wherein the instructions further cause the at least one processor to:
　receive the data associated with the game state image by decoding a game continuation image associated with the data; and
　cause the electronic game to be resumed.

12. The at least one non-transitory computer-readable storage medium of claim 9, wherein presentation of the data to a different electronic gaming device causes the game to be resumed at the different electronic gaming device.

13. The at least one non-transitory computer-readable storage medium of claim 12, wherein the different electronic gaming device comprises at least one of a smart phone, a tablet, a laptop, or the electronic device associated with the player.

14. The at least one non-transitory computer-readable storage medium of claim 9, wherein the instructions further cause the at least one processor to cause display of the game state image to be removed based on at least one of a period of time passing or an input received at the electronic gaming device.

15. The at least one non-transitory computer-readable storage medium of claim 9, wherein the instructions further cause the at least one processor to generate the game state image in response to receiving an input to save the state of the electronic game.

16. The at least one non-transitory computer-readable storage medium of claim 9, wherein the instructions further cause the at least one processor to generate the game state image as further encoding at least one of a date, time, or encryption key.

17. A method for game state retention of an electronic game implemented by at least one processor in communication with at least one memory, the method comprising:
　generating a game state image based on at least one game variable associated with a state of the electronic game at an electronic gaming device, wherein the game state image encodes the at least one game variable; and
　causing display of the game state image for capture by an electronic device associated with a player, wherein presentation of data associated with the game state image causes the electronic game to be resumed.

18. The method of claim 17, further comprising:
　receiving the data associated with the game state image by decoding a game continuation image associated with the data; and
　causing the electronic game to be resumed.

19. The method of claim 17, wherein presentation of the data to a different electronic gaming device causes the game to be resumed at the different electronic gaming device.

20. The method of claim 19, wherein the different electronic gaming device comprises at least one of a smart phone, a tablet, a laptop, or the electronic device associated with the player.

* * * * *